(12) United States Patent     (10) Patent No.:   US 12,689,249 B2

Wood et al.     (45) Date of Patent:     Jul. 21, 2026

(54) ELECTRIC MOTOR

(71) Applicant: MILWAUKEE ELECTRIC TOOL CORPORATION, Brookfield, WI (US)

(72) Inventors: Jacob G. Wood, Waukesha, WI (US); Carter H. Ypma, Milwaukee, WI (US); Jordan P. Gilsinger, Sussex, WI (US); Christopher J. Kujawski, Menomonee Falls, WI (US); Ryan Buttke, Franklin, WI (US); Andrew T. Beyerl, Pewaukee, WI (US); Linnea Emerson, Lisbon, WI (US); Matthew R. Bailey, Racine, WI (US); Jeffrey C. Hessenberger, Neosho, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 164 days.

(21) Appl. No.: 18/525,279

(22) Filed: Nov. 30, 2023

(65) Prior Publication Data

US 2024/0186845 A1     Jun. 6, 2024

Related U.S. Application Data

(60) Provisional application No. 63/385,884, filed on Dec. 2, 2022.

(51) Int. Cl.
    *H02K 1/18*       (2006.01)
    *H02K 7/08*       (2006.01)
          (Continued)

(52) U.S. Cl.
    CPC ............... *H02K 1/18* (2013.01); *H02K 7/083* (2013.01); *H02K 7/145* (2013.01); *H02K 11/21* (2016.01); *H02K 2211/03* (2013.01)

(58) Field of Classification Search
    CPC .......... H02K 1/18; H02K 11/21; H02K 7/083; H02K 7/145; H02K 2211/03; H02K 1/16
          (Continued)

(56) References Cited

U.S. PATENT DOCUMENTS

| 4,891,567 A | 1/1990 | Fujitani et al. |
| 5,497,040 A | 3/1996 | Sato |

(Continued)

FOREIGN PATENT DOCUMENTS

| CN | 201113737 Y | 9/2008 |
| CN | 201290035 Y | 8/2009 |

(Continued)

OTHER PUBLICATIONS

Partial European Search Report for Application No. 23213779.4 dated Apr. 19, 2024 (15 pages).

*Primary Examiner* — Jose A Gonzalez Quinones

(74) *Attorney, Agent, or Firm* — Michael Best & Friedrich LLP

(57) ABSTRACT

An electric motor includes a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount, the stator core assembly defining a central bore that receives the rotor shaft and the stator support portion. The electric motor also includes a bearing having an outer race and an inner race, the outer race being supported by the stator core assembly, and the inner race supporting the rotor shaft for (Continued)

rotation relative to the stator assembly. The stator core assembly further defines a bearing pocket adjacent to the central bore.

21 Claims, 42 Drawing Sheets

(51) Int. Cl.
*H02K 7/14* (2006.01)
*H02K 11/21* (2016.01)

(58) Field of Classification Search
USPC .......................................................... 310/50
See application file for complete search history.

(56) References Cited

U.S. PATENT DOCUMENTS

| | | | |
|---|---|---|---|
| 5,856,715 | A | 1/1999 | Peot et al. |
| 6,830,440 | B1 | 12/2004 | Riddoch |
| 7,019,423 | B1 | 3/2006 | Horng et al. |
| 7,350,283 | B2 | 4/2008 | Won et al. |
| 7,859,145 | B2 | 12/2010 | Rapp et al. |
| 8,067,870 | B2 | 11/2011 | Kobayashi et al. |
| 8,531,065 | B2 | 9/2013 | Knorr et al. |
| 8,810,086 | B2 | 8/2014 | Best et al. |
| 8,872,398 | B2 | 10/2014 | Ota |
| 8,922,082 | B2 | 12/2014 | Kwon |
| 9,345,193 | B2 | 5/2016 | Wu |
| 9,385,572 | B2 | 7/2016 | Lu et al. |
| 9,685,840 | B2 | 6/2017 | Germann et al. |
| 9,729,037 | B2 | 8/2017 | Li et al. |
| 9,755,479 | B2 | 9/2017 | O |
| 9,937,570 | B2 | 4/2018 | Chen et al. |
| 10,056,808 | B2 | 8/2018 | Pozmantir et al. |
| 10,148,139 | B2 | 12/2018 | Lauk et al. |
| 10,193,416 | B2 | 1/2019 | Germann et al. |
| 10,193,417 | B2 | 1/2019 | Fogle et al. |
| 10,253,676 | B2 | 4/2019 | Gossling et al. |
| 10,424,998 | B2 | 9/2019 | Keil et al. |
| 10,605,248 | B2 | 3/2020 | Wagner et al. |
| 10,673,295 | B2 | 6/2020 | Looi et al. |
| 10,693,344 | B2 | 6/2020 | Purohit et al. |
| 10,714,997 | B2 | 7/2020 | Chu et al. |
| 10,903,723 | B2 | 1/2021 | Chen |
| 10,974,381 | B2 | 4/2021 | Schadow et al. |
| 11,025,139 | B2 | 6/2021 | Li et al. |
| 11,081,933 | B2 | 8/2021 | Fogle et al. |
| 11,165,297 | B2 | 11/2021 | Valentini |
| 11,202,541 | B2 | 12/2021 | Keil et al. |
| 11,318,597 | B2 | 5/2022 | Tam |
| 11,437,900 | B2 | 9/2022 | Billings et al. |
| 2007/0132323 | A1 | 6/2007 | Park |
| 2011/0006634 | A1 | 1/2011 | Nomura et al. |
| 2013/0333228 | A1 | 12/2013 | Ota et al. |
| 2015/0303753 | A1 | 10/2015 | Huang et al. |
| 2017/0248145 | A1 | 8/2017 | Chu et al. |
| 2017/0264177 | A1 | 9/2017 | Lee et al. |
| 2019/0044424 | A1 | 2/2019 | Sugaki et al. |
| 2020/0161927 | A1 | 5/2020 | Marjomaa et al. |
| 2020/0274421 | A1 | 8/2020 | Purohit et al. |
| 2020/0343780 | A1 | 10/2020 | Fogle et al. |
| 2020/0343789 | A1 | 10/2020 | Fogle et al. |
| 2021/0050766 | A1 | 2/2021 | Lee et al. |
| 2021/0091614 | A1 | 3/2021 | Fukinuki et al. |
| 2021/0167672 | A1 | 6/2021 | Chen |
| 2021/0194321 | A1* | 6/2021 | Jefferies ............... H02K 5/1735 |
| 2021/0194341 | A1 | 6/2021 | Billings et al. |
| 2021/0218303 | A1 | 7/2021 | Semidey |
| 2021/0277894 | A1 | 9/2021 | Homma et al. |
| 2021/0283762 | A1 | 9/2021 | Kusumoto et al. |
| 2021/0328467 | A1 | 10/2021 | Tomiyama et al. |
| 2021/0359575 | A1 | 11/2021 | Fogle et al. |
| 2022/0224184 | A1 | 7/2022 | Goos et al. |

FOREIGN PATENT DOCUMENTS

| | | | |
|---|---|---|---|
| CN | 101931300 | A | 12/2010 |
| CN | 201742279 | U | 2/2011 |
| CN | 201887637 | U | 6/2011 |
| CN | 202309466 | U | 7/2012 |
| CN | 202513699 | U | 10/2012 |
| CN | 202586699 | U | 12/2012 |
| CN | 202679200 | U | 1/2013 |
| CN | 202679201 | U | 1/2013 |
| CN | 202696436 | U | 1/2013 |
| CN | 202696437 | U | 1/2013 |
| CN | 204068492 | U | 12/2014 |
| CN | 104393733 | A | 3/2015 |
| CN | 204295054 | U | 4/2015 |
| CN | 204392040 | U | 6/2015 |
| CN | 204696893 | U | 10/2015 |
| CN | 204721125 | U | 10/2015 |
| CN | 204794620 | U | 11/2015 |
| CN | 204886623 | U | 12/2015 |
| CN | 105429413 | A | 3/2016 |
| CN | 105471213 | A | 4/2016 |
| CN | 105896866 | A | 8/2016 |
| CN | 205565924 | U | 9/2016 |
| CN | 205657571 | U | 10/2016 |
| CN | 205753913 | U | 11/2016 |
| CN | 106451857 | A | 2/2017 |
| CN | 106787580 | A | 5/2017 |
| CN | 206250859 | U | 6/2017 |
| CN | 206250941 | U | 6/2017 |
| CN | 107359732 | A | 11/2017 |
| CN | 206834951 | U | 1/2018 |
| CN | 107887996 | A | 4/2018 |
| CN | 107979202 | A | 5/2018 |
| CN | 207588578 | U | 7/2018 |
| CN | 207743835 | U | 8/2018 |
| CN | 109586425 | A | 4/2019 |
| CN | 208835862 | U | 5/2019 |
| CN | 208955767 | U | 6/2019 |
| CN | 110011508 | A | 7/2019 |
| CN | 209299040 | U | 8/2019 |
| CN | 110504766 | A | 11/2019 |
| CN | 110556940 | A | 12/2019 |
| CN | 110601445 | A | 12/2019 |
| CN | 210041517 | U | 2/2020 |
| CN | 210111769 | U | 2/2020 |
| CN | 211188193 | U | 8/2020 |
| CN | 211239471 | U | 8/2020 |
| CN | 112054622 | A | 12/2020 |
| CN | 112072882 | A | 12/2020 |
| CN | 212085912 | U | 12/2020 |
| CN | 212258589 | U | 12/2020 |
| CN | 112366914 | A | 2/2021 |
| CN | 212627623 | U | 2/2021 |
| CN | 112436637 | A | 3/2021 |
| CN | 112448508 | A | 3/2021 |
| CN | 213195912 | U | 5/2021 |
| CN | 213717710 | U | 7/2021 |
| CN | 113290289 | A | 8/2021 |
| CN | 213906534 | U | 8/2021 |
| CN | 113422488 | A | 9/2021 |
| CN | 113510664 | A | 10/2021 |
| CN | 214900401 | U | 11/2021 |
| CN | 215545415 | U | 1/2022 |
| CN | 215601128 | U | 1/2022 |
| CN | 114054848 | A | 2/2022 |
| CN | 215733732 | U | 2/2022 |
| CN | 215956165 | U | 3/2022 |
| CN | 216134321 | U | 3/2022 |
| CN | 307168814 | S | 3/2022 |
| CN | 114362392 | A | 4/2022 |
| CN | 216290557 | U | 4/2022 |
| CN | 216904436 | U | 7/2022 |
| CN | 114928210 | A | 8/2022 |
| DE | 3726413 | A1 | 2/1989 |
| DE | 10258346 | A1 | 6/2004 |
| DE | 102006059135 | A1 | 6/2008 |
| DE | 202009008806 | U1 | 9/2009 |
| DE | 202013104731 | U1 | 12/2013 |

(56)          References Cited

FOREIGN PATENT DOCUMENTS

| | | | |
|---|---|---|---|
| DE | 102014224152 | A1 | 6/2016 |
| DE | 202016103204 | U1 | 12/2016 |
| DE | 102020004844 | A1 | 2/2022 |
| EP | 1513244 | A1 | 3/2005 |
| EP | 1560319 | A1 | 8/2005 |
| WO | WO8807285 | A1 | 9/1988 |
| WO | WO2015143853 | A1 | 10/2015 |
| WO | WO2016019829 | A1 | 2/2016 |
| WO | WO2016199398 | A1 | 12/2016 |
| WO | WO2016201808 | A1 | 12/2016 |
| WO | WO2018010699 | A1 | 1/2018 |
| WO | WO2018076989 | A1 | 5/2018 |
| WO | WO2019127774 | A1 | 7/2019 |
| WO | WO2021179435 | A1 | 9/2021 |
| WO | WO2022188830 | A1 | 9/2022 |

* cited by examiner

ELECTRIC MOTOR

CROSS-REFERENCE TO RELATED APPLICATIONS

This application claims priority to U.S. Provisional Patent Application No. 63/385,884, filed Dec. 2, 2022, the entire content of which is hereby incorporated by reference.

FIELD OF THE DISCLOSURE

The present disclosure relates to electric motors, and more specifically to outer rotor electric motors.

BACKGROUND OF THE DISCLOSURE

Electric motors typically include a stationary field or stator, and a rotatable armature or rotor. The stator remains fixedly retained by a surrounding motor support structure. The rotor is rotatably supported relative to the stator and the surrounding motor support structure. During operation, the rotor rotates relative to the stator to provide a torque output of the motor.

In an outer rotor motor design, at least a portion of the rotor is located radially outward of the stator and surrounds the stator. The stator resides generally inside of or within the rotor and is fixedly supported relative to the rotor and relative to the surrounding motor support structure.

SUMMARY OF THE DISCLOSURE

The present disclosure provides, in one aspect, an electric motor including a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount, the stator core assembly defining a central bore that receives the rotor shaft and the stator support portion. The electric motor also includes a bearing having an outer race and an inner race, the outer race being supported by the stator core assembly, and the inner race supporting the rotor shaft for rotation relative to the stator assembly. The stator core assembly further defines a bearing pocket adjacent the central bore and configured to receive the outer race of the bearing. A step is formed where the bearing pocket transitions to the central bore.

The present disclosure provides, in another aspect, a power tool including a housing and an electric motor. The electric motor includes a rotor assembly including a rotor shaft, a rotor body fixedly coupled to the rotor shaft, and a plurality of magnets coupled to the rotor body. The electric motor also includes a stator assembly at least partially received within the rotor assembly. The stator assembly includes a stator mount having a stator support portion and a motor support portion. The stator assembly also includes a stator core assembly fixedly supported by the stator mount, the stator core assembly defining a central bore that receives the rotor shaft and the stator support portion. The power tool also includes an adapter configured to fixedly couple to the motor support portion, the adapter including a first coupler. The power tool further includes a gear case including a second coupler configured to be received by the first coupler to removably couple the adapter to the gear case.

The present disclosure provides, in another aspect, an electric motor including a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount, the stator core assembly including a stator core and an insulator coupled to the stator core, the stator core defining a central bore that receives the rotor shaft and the stator support portion. The stator assembly further includes a plurality of windings that define a plurality of coils supported on the stator core assembly. The electric motor also includes a printed circuit board assembly (PCBA) affixed to the insulator. The insulator defines a plurality of standoffs that protrude axially away from the stator core. The PCBA includes a circuit board that defines a plurality of through holes configured to receive the plurality of standoffs to secure the PCBA to the insulator.

The present disclosure provides, in another aspect, an electric motor including a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount and defining a plurality of teeth, the stator core assembly including a stator core and an insulator coupled to the stator core, the stator core defining a central bore that receives the rotor shaft and the stator support portion. The stator assembly also includes a plurality of windings that define a plurality of coils supported on the plurality of teeth. The stator assembly further includes a terminal arrangement including a plurality of terminals configured to mechanically and electrically connect to the plurality of windings, the plurality of terminals being supported on a cylindrical end wall that protrudes axially from the insulator at an inner periphery of the insulator.

The present disclosure provides, in another aspect, an electric motor including a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount and defining a plurality of teeth, the stator core assembly including a stator core and an insulator coupled to the stator core, the stator core defining a central bore that receives the rotor shaft and the stator support portion, the insulator defining a cylindrical end wall that protrudes axially from the stator core at an inner periphery of the insulator. The stator assembly further includes a plurality of windings that define a plurality of coils supported on the plurality of teeth. The stator assembly also includes a terminal arrangement including a commutator ring having a plurality of terminals angularly spaced apart from one another by a plurality of insulating portions, the commutator ring being supported about the cylindrical end wall, the plurality of terminals being configured to mechanically and electrically connect to the plurality of windings.

The present disclosure provides, in another aspect, an electric motor including a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount and defining a plurality of teeth, the stator core assembly including a stator core and an insulator coupled to the stator core, the stator core defining a central bore that receives the rotor shaft and the stator support portion. The stator assembly further includes a plurality of windings that define a plurality of coils supported on the plurality of teeth. The stator assembly also includes a terminal arrangement including a commutator ring having a plurality of terminals angularly spaced apart from one another by a plurality of insulating portions, the plurality of terminals being configured to mechanically and electrically connect to the plurality of windings. The electric motor also includes a printed circuit board assembly (PCBA) affixed to the insulator. The commutator ring is supported about the stator core assembly by the PCBA.

The present disclosure provides, in another aspect, an electric motor including a rotor assembly including a rotor shaft, a rotor body fixedly coupled to the rotor shaft, and a plurality of magnets coupled to the rotor body. The electric motor also includes a stator assembly at least partially received within the rotor body. The stator assembly includes a stator mount including a stator support portion and a motor support portion. The stator assembly also includes a stator core assembly fixedly supported by the stator mount and defining a plurality of teeth, the stator core assembly including a stator core and an insulator coupled to the stator core, the stator core defining a central bore that receives the rotor shaft and the stator support portion. The stator assembly further includes a plurality of windings that define a plurality of coils supported on the plurality of teeth. The electric motor also includes a printed circuit board assembly (PCBA) affixed to the insulator, the PCBA including a circuit board having an annular shape and including an inner periphery and an outer periphery in a radial direction, the circuit board further including a plurality of horns located at the inner periphery and protruding radially inward, each horn supporting a conductive pad. The plurality of horns are configured to mechanically and electrically connect to the plurality of windings.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
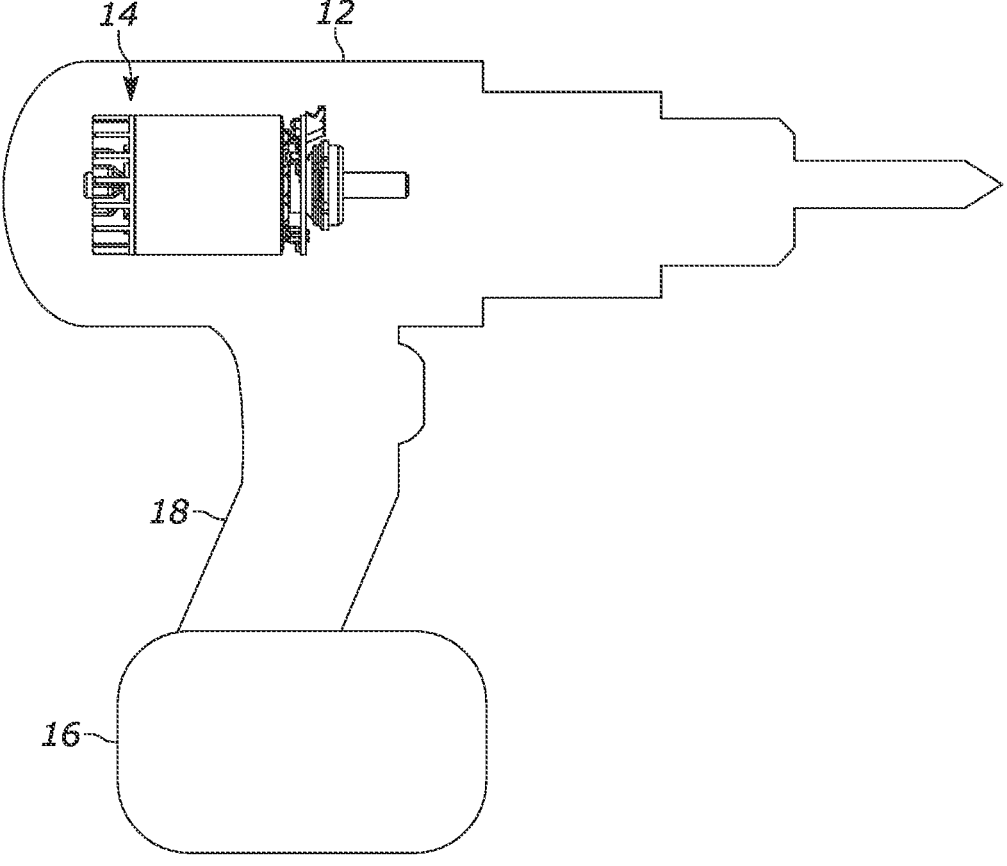
FIG. 1 is a schematic view of a power tool according to one embodiment of the disclosure.
Figure 2:
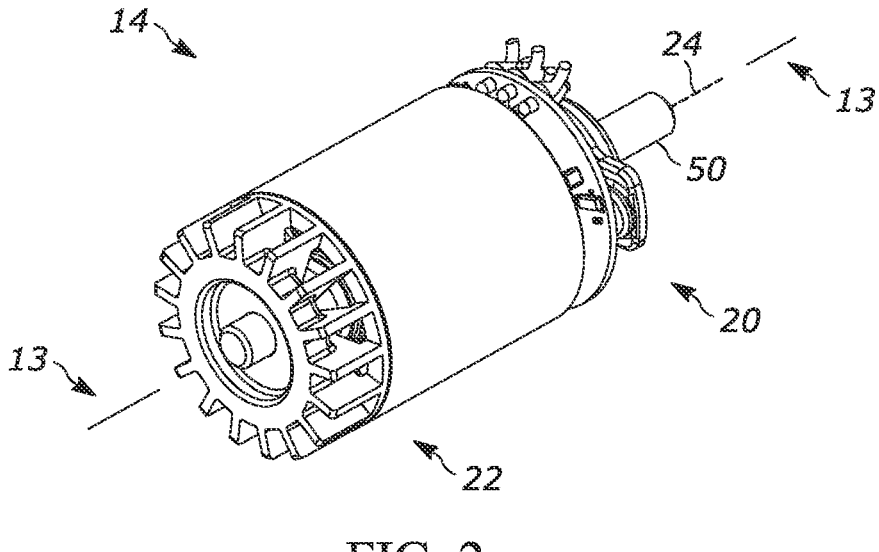
FIGS. 2 and 3 are perspective views of an electric motor of the power tool of FIG.

FIG. 1 illustrates a power tool 10 such as, e.g., a drill, a rotary impact tool, and the like. The power tool 10 includes a housing 12 and an electric motor 14. The power tool 10 is operable with a battery pack 16 removably coupled to a battery receptacle 18 located at a bottom end of the housing 12. The battery pack 16 includes a plurality of battery cells (not shown), which are electrically connected to provide the desired output (e.g., nominal voltage, current capacity, etc.) of the battery pack 16. The electric motor 14 receives power from the battery pack 16 when the battery pack 16 is coupled to the battery receptacle 18.

In some embodiments, the power tool 10 may include a power cord for electrically connecting the motor 14 to a source of AC power. The battery pack 16 is the preferred means for powering the power tool 10, however, because a cordless power tool can be used in locations where other power sources are unavailable.

With reference to FIGS. 2-5, the illustrated motor 14 is a brushless direct current ("BLDC") electric motor with a stator 20 and a rotor 22 that is rotatable with respect to the stator 20 about an axis 24. The BLDC electric motor 14 is an "outer rotor" BLDC electric motor with the rotor 22 generally surrounding the stator 20. As such, the rotor 22 is an outer rotor 22 and the stator 20 is an inner stator 20 that is at least partially received within and generally surrounded by the outer rotor 22.

Figure 12:
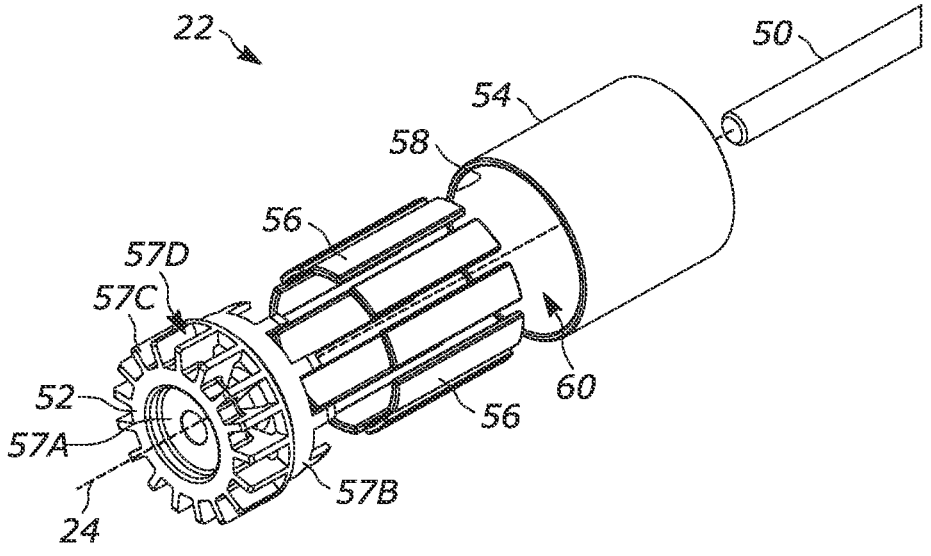
FIG. 12 is a partially exploded perspective view of the rotor of FIG. 9.

With reference to FIGS. 6-9, the stator 20 includes a stator mount 26, a stator core assembly 28 fixedly supported by the stator mount 26, and a plurality of wires or stator windings 30 that define a plurality of coils 32 (FIG. 12). The stator core assembly 28 includes a stator core 34 formed, in the illustrated construction, by a stack of laminations, and an insulator 36 molded to the core 34. The stator core 34 includes a central core back 38 and a plurality of teeth 40 protruding outwardly from the core back 38. The coils 32 are formed about the teeth 40 and insulated therefrom by the insulator 36. The core back 38 defines a core central bore 42 that extends longitudinally therethrough, the stator mount 26 includes an elongated stator support portion 44 and a motor support portion 46 located at one longitudinal end of the stator support portion 44. The stator support portion 44 is tubular in shape and supports the stator core assembly 28. More specifically, the core central bore 42 of the stator core 34 receives the stator support portion 44, such that the stator core assembly 28 is rigidly supported about the stator support portion 44. In some examples, the stator core 34 can receive the stator support portion 44 by press fit or interference fit. In other examples, the stator support portion 44 can be affixed to the stator core 34 by a molding process. The stator mount 26 further defines a mount central bore 48 that extends longitudinally therethrough, including through both of the stator support portion 44 and the motor support portion 46.

With reference to FIGS. 9-12, the rotor 22 includes a central rotor shaft 50, a rotor frame 52, a tubular rotor body 54, and a plurality of permanent magnets 56. The rotor frame 52 is annular in shape and includes a central portion 57A that is affixed to the rotor shaft 50. An outer peripheral portion 57B of the rotor frame 52 is affixed to the rotor body 54. As such, the rotor frame 52 affixes the rotor body 54 to the rotor shaft 50 for co-rotation therewith. A plurality of radially and axially extending blades 57C extend between and connect the central portion 57A to the outer peripheral portion 57B, and a plurality of airflow apertures 57D are defined between each pair of adjacent blades 57C. The blades 57C operate as a fan to generate an airflow that passes through the airflow apertures, thereby cooling the electric motor 14.

In some embodiments, the rotor frame 52 can be formed from a metal or metal alloy such as, e.g., zinc or steel. In other embodiments, the frame 52 can be molded from a resin material.

The rotor body 54 is tubular in shape and has a radially inner surface 58 that defines a central cavity 60. The permanent magnets 56 are fixedly supported on the radially inner surface 58 of the rotor body 54.

Figure 13:
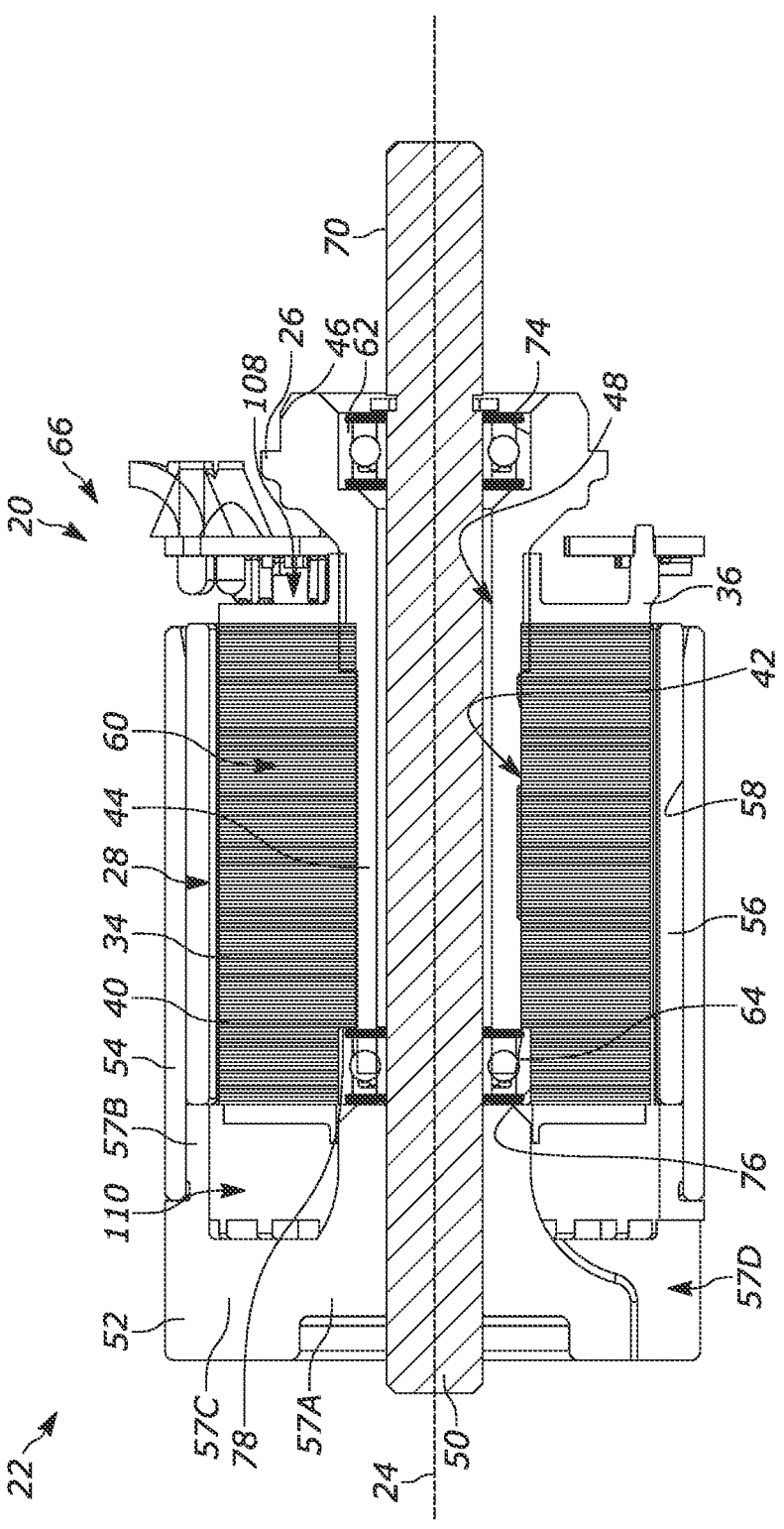
FIG. 13 is a cross-sectional view of the electric motor of FIG. 2, taken along line 13-13 of FIG. 2.

As shown in FIG. 13, the rotor body 54 is located radially outward from the stator 20 and surrounds portions of the stator 20, including the stator core assembly 28, the coils 32, and portions of the stator mount 26. Portions of the stator 20, including all or generally most of the stator core assembly 28, are received into the central cavity 60 of the rotor body 54.

With continued reference to FIG. 13, the rotor shaft 50 is rotatably supported relative to the stator 20 by two bearings including a first bearing 62 and a second bearing 64. As such, the rotor 22 (i.e., including the rotor shaft 50, the rotor frame 52, the rotor body 54, and the magnets 56) rotates relative to the stator 20. When the motor 14 is supported within the housing 12 of the power tool 10 (FIG. 1), the rotor 22 is rotatable relative to both the housing 12 and the stator 20, whereas the stator 20 does not rotate relative to the housing 12. The rotor shaft 50 extends centrally through the stator 20, both through the core central bore 42 and the mount central bore 48.

Figure 12A:
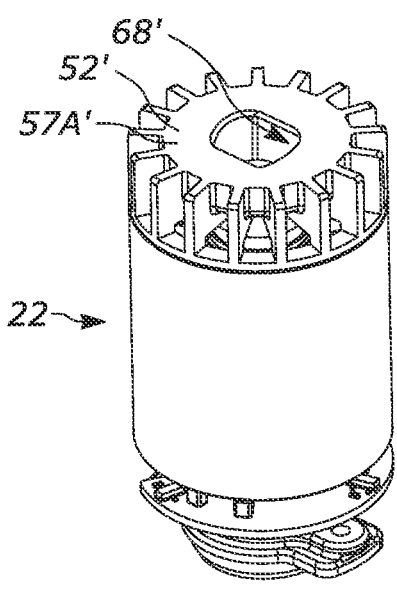
FIG. 12A is a perspective view of a rotor frame of the rotor of FIG. 9 according to another embodiment.

FIG. 12A illustrates a modified rotor frame 52′ that can be utilized in the rotor 22 (FIGS. 6 and 7) in place of the rotor frame 52. The modified rotor frame 52′ is substantially elongated in the axial direction as compared to the rotor frame 52. A central portion 57A' of the rotor frame 52' defines a recess 68' having a non-circular cross-sectional shape. The recess 68' is capable of receiving a non-circular protrusion (e.g., by nominal slip fit) of a transmission component (not shown) of the power tool 10 (FIG. 1). When the protrusion is inserted into the recess 68', the rotor frame 52' itself can function to transmit torque to the transmission component. In other embodiments (not shown), the rotor frame 52' can alternatively include the non-circular protrusion, and the transmission component can include the non-circular recess configured to receive the protrusion in order to transmit torque therebetween.

With reference again to FIG. 3, the motor 14 further includes an annular printed circuit board assembly (PCBA) 66 affixed to the insulator 36 of the stator 20, as will be described in greater detail below. The PCBA 66 can include at least one position sensor, such as a Hall effect sensor, operable to detect a position of the permanent magnets 56 of the rotor 22. In addition, or alternatively, the PCBA 66 can include a plurality of switching circuits (e.g., Field-Effect Transistors (FETs)) operable to electrically commutate the motor 14.

Figure 3:
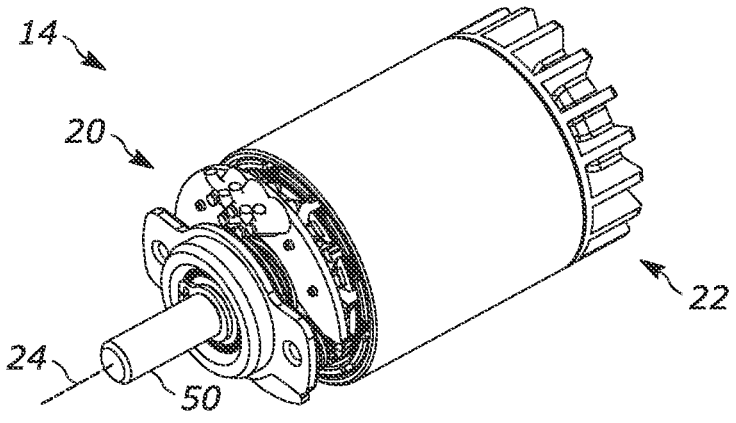
Figure 4:
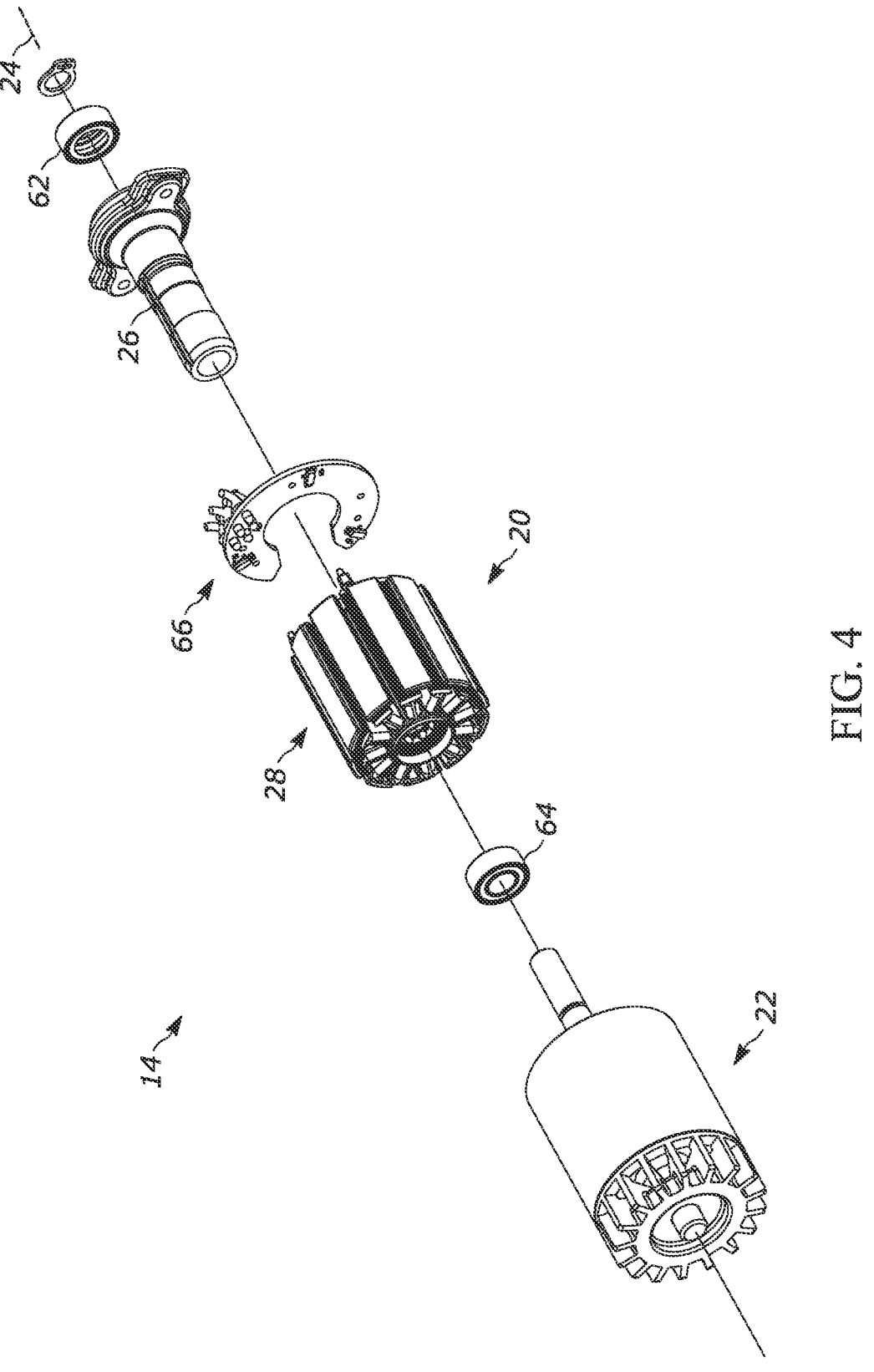
FIGS. 4 and 5 are partially exploded perspective views of the electric motor of FIG. 2.
Figure 5:
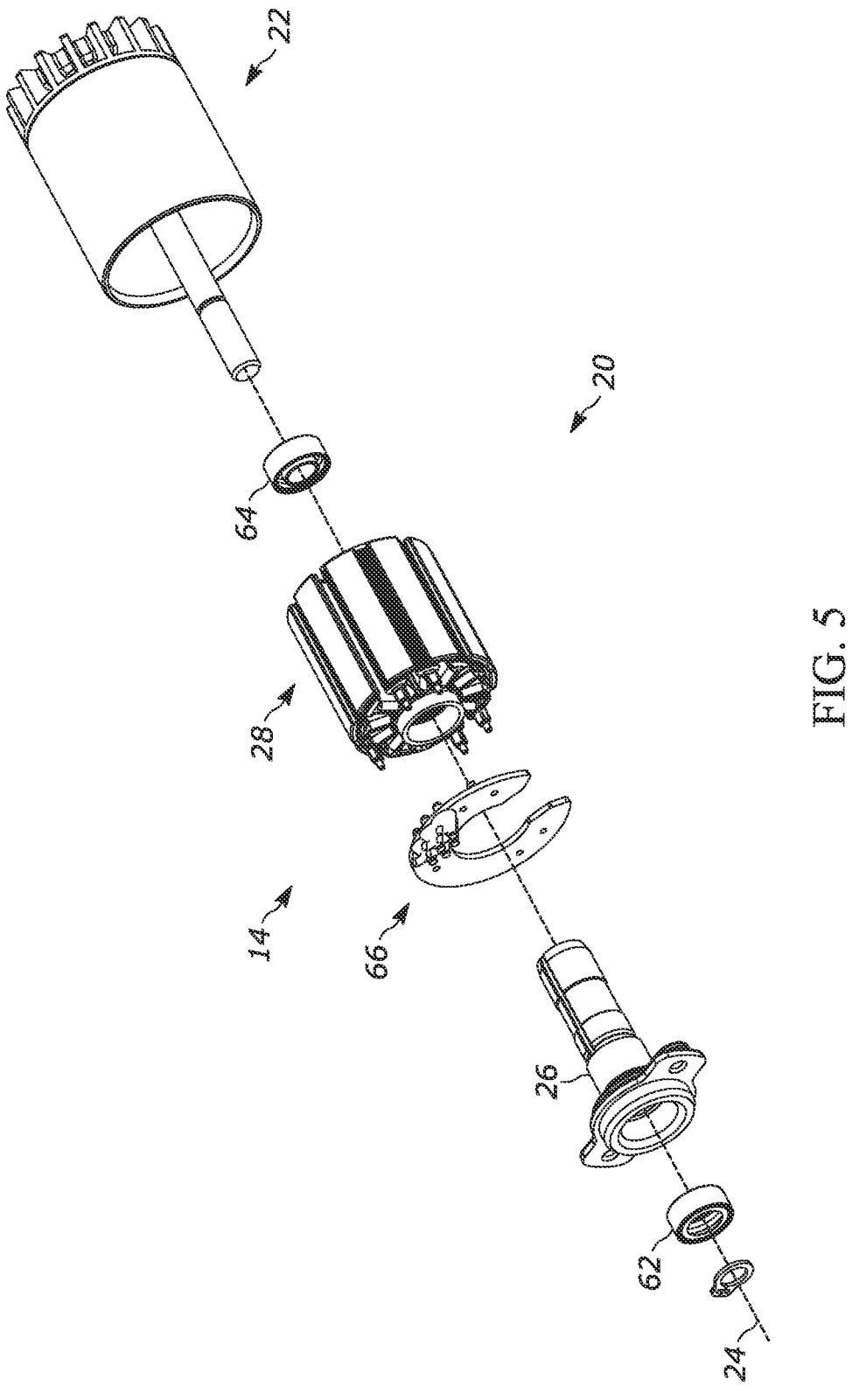
Figure 6:
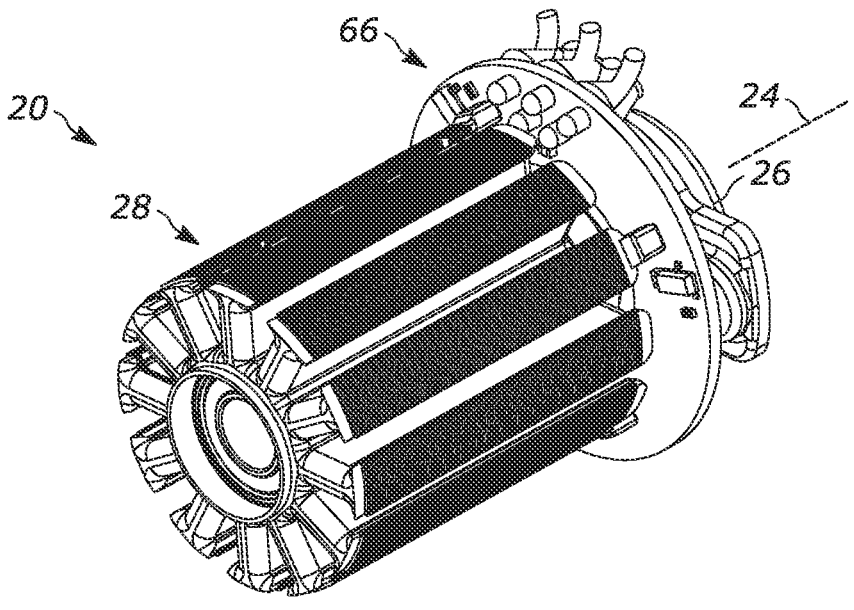
FIGS. 6 and 7 are perspective views of a stator of the electric motor of FIG. 2.
Figure 7:
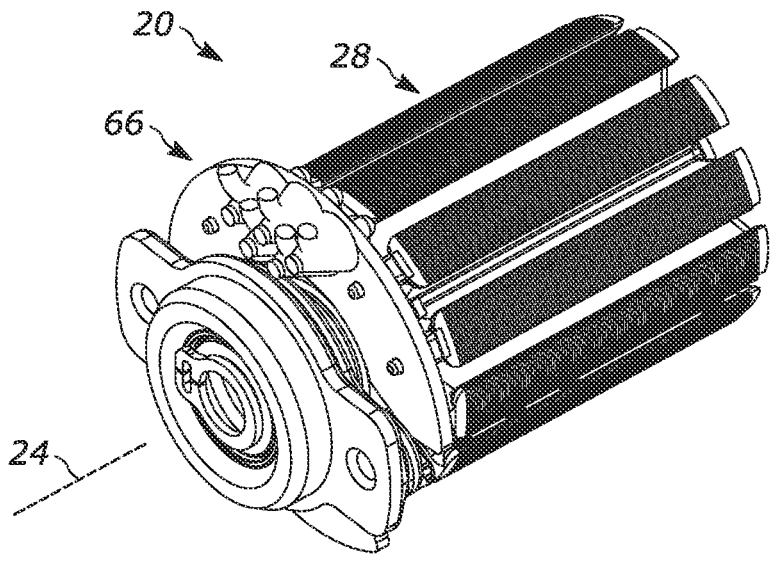

As further shown in FIG. 3, the rotor shaft 50 includes an output end 70 that, in the illustrated embodiment, protrudes beyond the motor support portion 46 of the stator mount 26. The output end 70 can fixedly couple to an output member (e.g., a pinion gear), such as a pinion gear 72A illustrated in FIG. 15A. The pinion gear 15A can be located on the output end 70 of the rotor shaft 50 to provide a rotational output for the motor 14 adjacent to the stator mount 26 and distant from the rotor frame 52. In other embodiments, the motor can alternatively be configured to provide rotational output adjacent to the rotor mount, as will be discussed further herein.

In operation, the coils 32 are electrically energized to cause the rotor 22 to rotate relative to the stator 20. The rotor shaft 50, the frame 52, and the rotor body 54 co-rotate together and rotate relative to the stator 20 and the PCBA 66.

Figure 8:
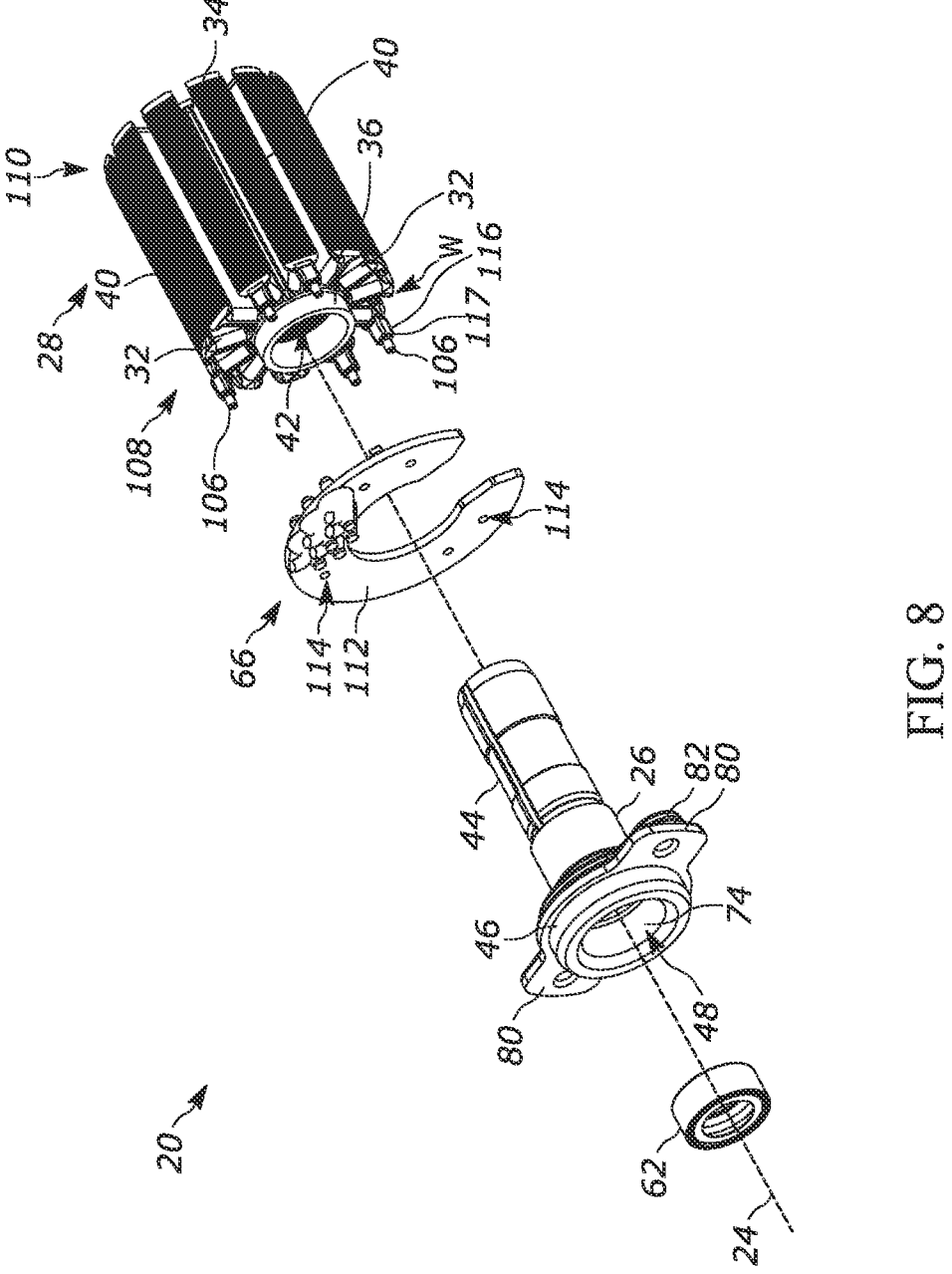
FIG. 8 is a partially exploded perspective view of the stator of FIG. 7.

With reference to FIGS. 8 and 13, the first bearing 62 is received into a first bearing pocket 74 defined in the motor support portion 46 of the stator mount 26. An outer race of the first bearing 62 is fixedly held by the motor support portion 46, within the first bearing pocket 74, and an inner race of the first bearing 62 rotatably supports the rotor shaft 50.

Figure 14:
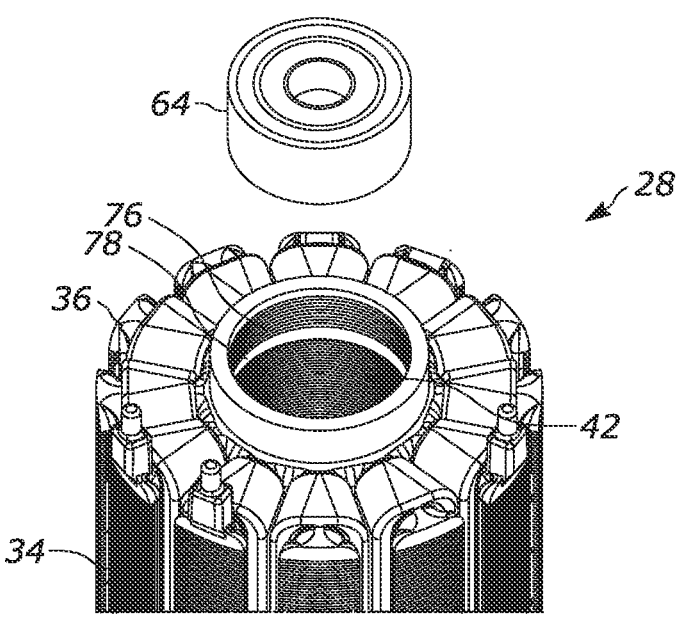
FIG. 14 is a partially exploded perspective view of portions of the stator of FIG. 7.

With reference to FIGS. 13 and 14, in the illustrated embodiment, the second bearing 64 is received into a second bearing pocket 76 defined in the stator core 34. The second bearing pocket 76 is defined at an axial end of the stator core 34 and located adjacent the core central bore 42. Both the second bearing pocket 76 and the core central bore 42 have circular cross-sectional shapes. In the illustrated embodiment, the second bearing pocket 76 has a larger diameter than the core central bore, such that a shoulder or step 78 is defined therebetween. An outer race of the second bearing 64 is fixedly held by the stator core 34 within the second bearing pocket 76. An inner race of the second bearing 64 rotatably supports the rotor shaft 50. The outer race of the second bearing 64 can abut the step 78, such that the step 78 fixes the position of the second bearing 64 in the axial direction.

Figure 15A:
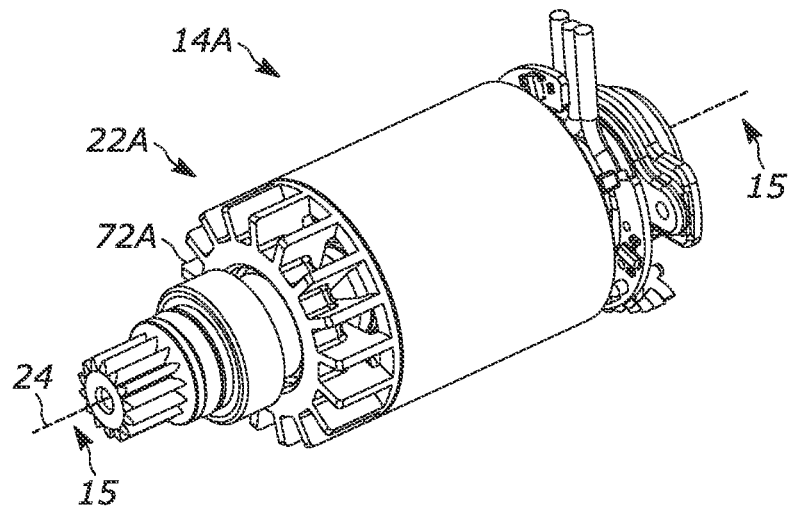
FIG. 15A is a perspective view of an electric motor according to another embodiment.
Figure 15B:
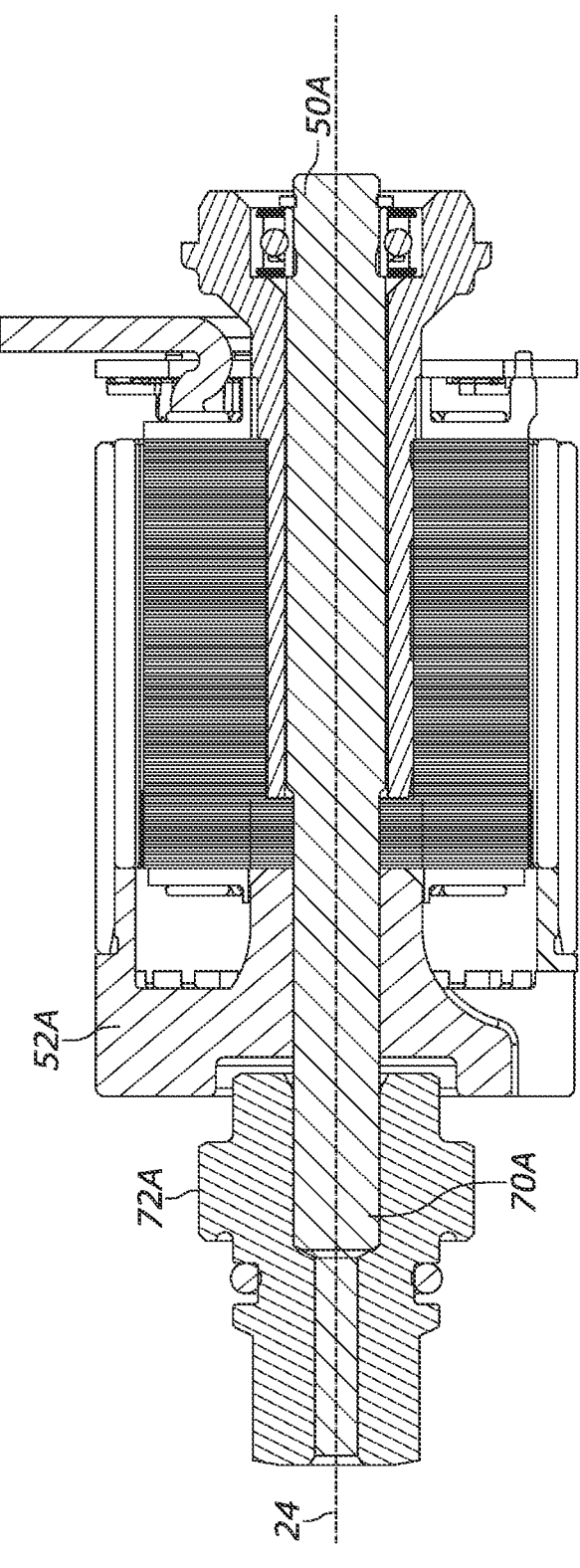
FIG. 15B is a cross-sectional view of the electric motor of FIG. 15A, taken along line 15-15 of FIG. 15A.

FIGS. 15A and 15B illustrate an alternative embodiment of a motor 14A that provides a rotational output adjacent to the rotor frame rather than adjacent to the stator mount. Specifically, the motor 14A is substantially similar to the motor 14 described herein, except that the motor 14A includes a modified rotor 22A having a rotor shaft 50A with an output end 70A that protrudes beyond the rotor frame 52A. The output end 70A can fixedly couple to an output member, such as the illustrated pinion gear 72A.

Figure 16A:
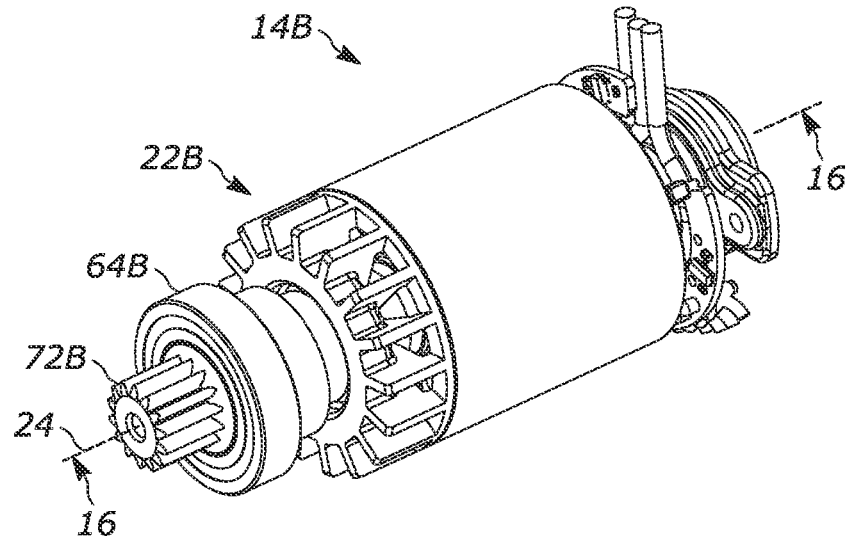
FIG. 16A is a perspective view of an electric motor according to another embodiment.
Figure 16B:
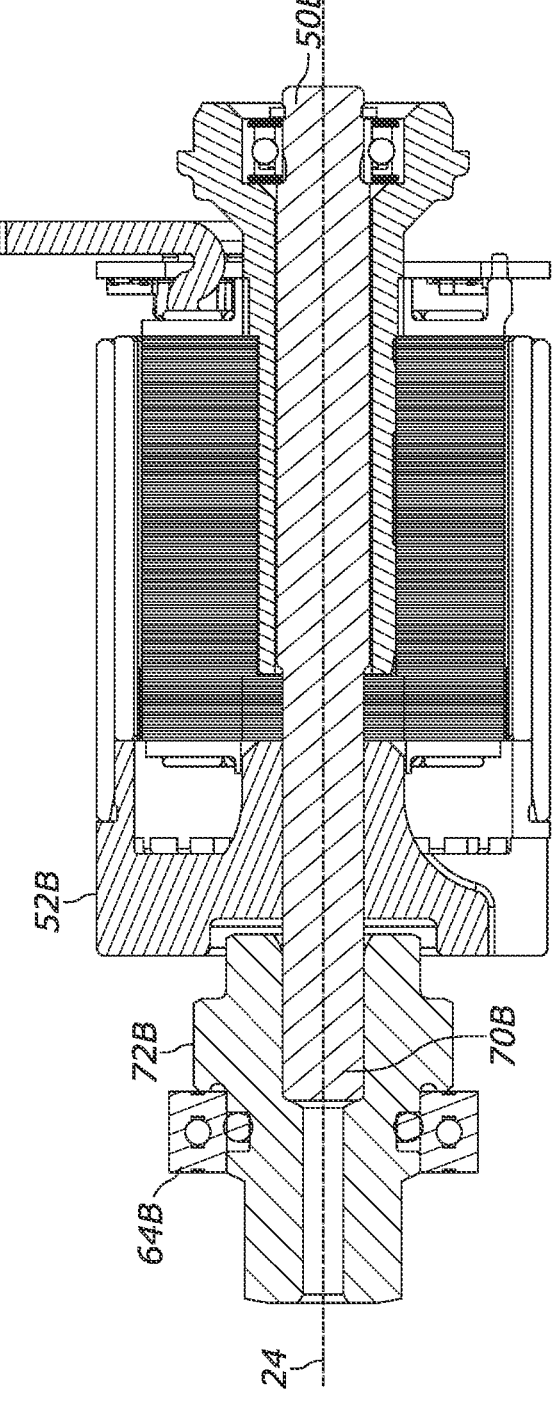
FIG. 16B is a cross-sectional view of the electric motor of FIG. 16A, taken along line 16-16 of FIG. 16A.

FIGS. 16A and 16B illustrate another alternative embodiment of a motor 14B that, like the motor 14A, provides a rotational output adjacent to the rotor frame rather than adjacent to the stator mount. The motor 14B is substantially similar to the motor 14A described herein, and generally similar to the motor 14 described herein, except that the motor 14B includes a second bearing 64B that is not located within the stator core 34B. Instead, an inner race of the second bearing 64B is positioned about an outer diameter of the output member or pinion gear 72B. An outer race of the second bearing 64B can be fixedly supported by another feature of the power tool 10 (FIG. 1), such as, e.g., the housing 12, a gear case, or the like.

With reference to FIG. 17 and turning again to the electric motor 14 described herein, the motor support portion 46 includes, in the illustrated embodiment, two radially protruding tabs 80 located opposite one another about the axis 24, and two corresponding screw bosses 82 formed on the tabs 80. The screw bosses 82 can receive screws (not shown) to directly secure the stator mount 26 to a separate motor support structure to thereby support the motor 14.

Figure 17:
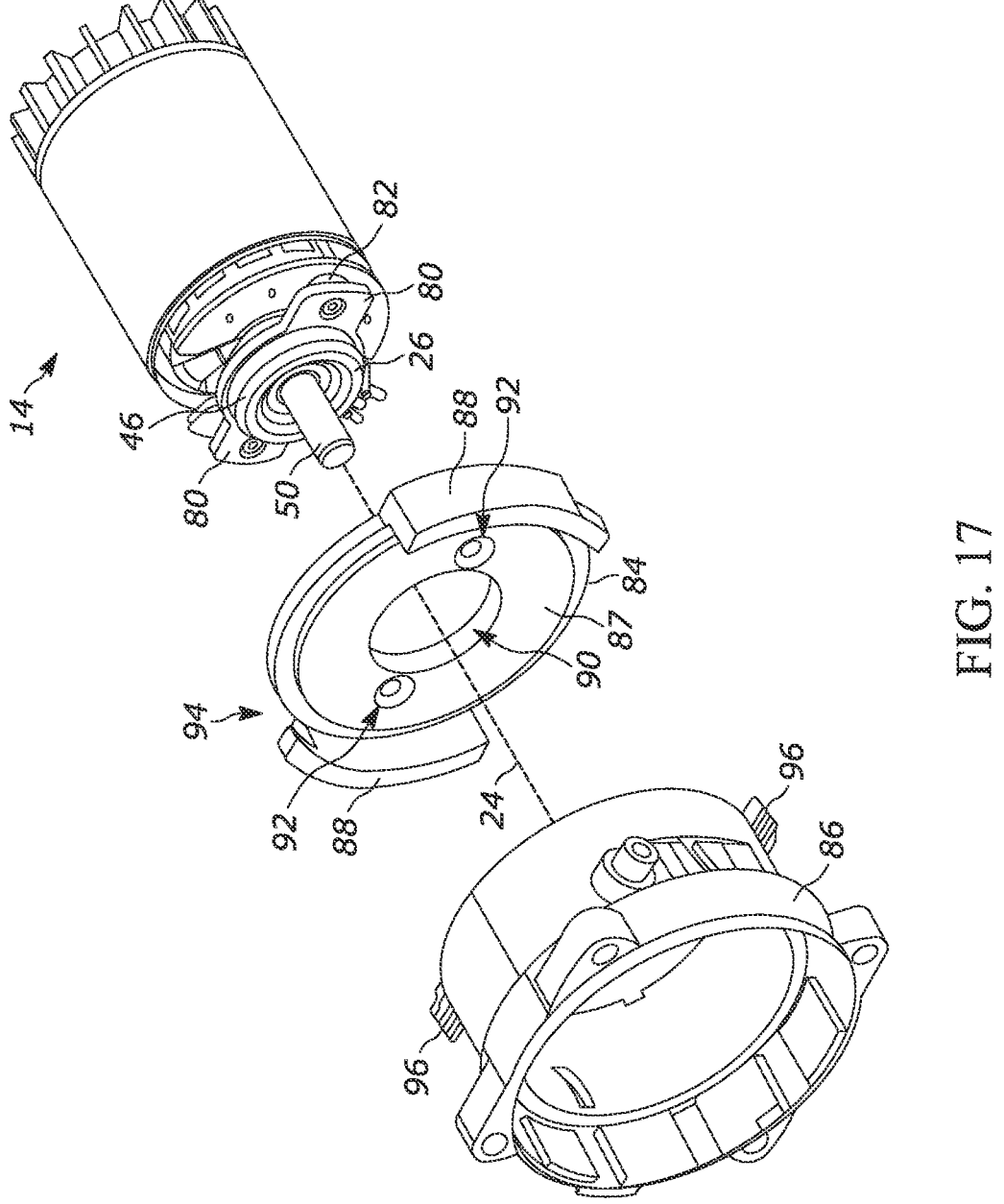
FIG. 17 is a partially exploded perspective view of the electric motor of FIG. 2, a gear case, and an adapter plate.
Figure 18A:
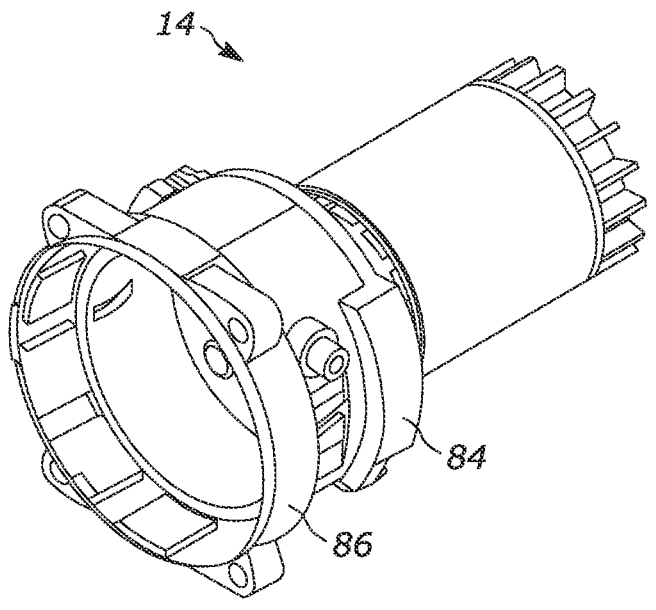
FIGS. 18A and 18B are perspective views illustrating the adapter plate of FIG. 17 coupled to the electric motor of FIG. 2 and the gear case of FIG. 17.
Figure 18B:
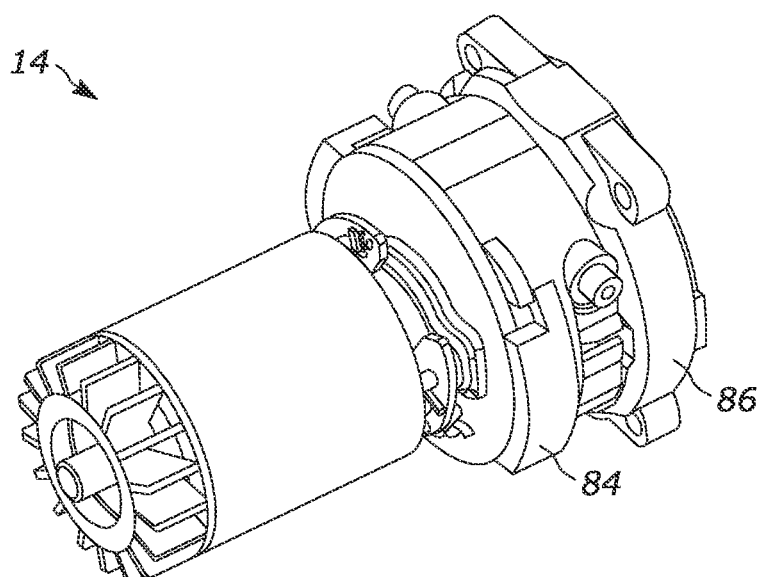

With reference to FIGS. 17-18B, the motor 14 can also include a modular adapter plate 84 that removably couples to the motor support portion 46 of the stator mount 26 (e.g., via threaded fasteners). The adapter plate 84 is further configured to removably couple to a stationary component such as a gear case 86 shown in FIG. 17. The adapter plate 84 includes a base plate 87 and two annular outer bayonet couplers 88 formed at a periphery of the base plate 87 and located generally opposite one another with respect to the axis 24. The base plate 87 defines a central aperture 90 that permits a portion of the rotor shaft 50 to pass therethrough. The base plate 87 also defines, in the illustrated embodiment, two fastener apertures 92 that correspond to the two screw bosses 82 formed on the stator mount 26. The outer bayonet couplers 88 define slots 94. The gear case 86 includes two outwardly protruding tabs 96 that correspond to the two bayonet couplers 88. The slots 94 of the bayonet couplers 88 receive the tabs 96 of the gear case 86 to secure the adapter plate 84 to the gear case 86, and thereby couple the stator mount 26 to the gear case 86.

Figure 19:
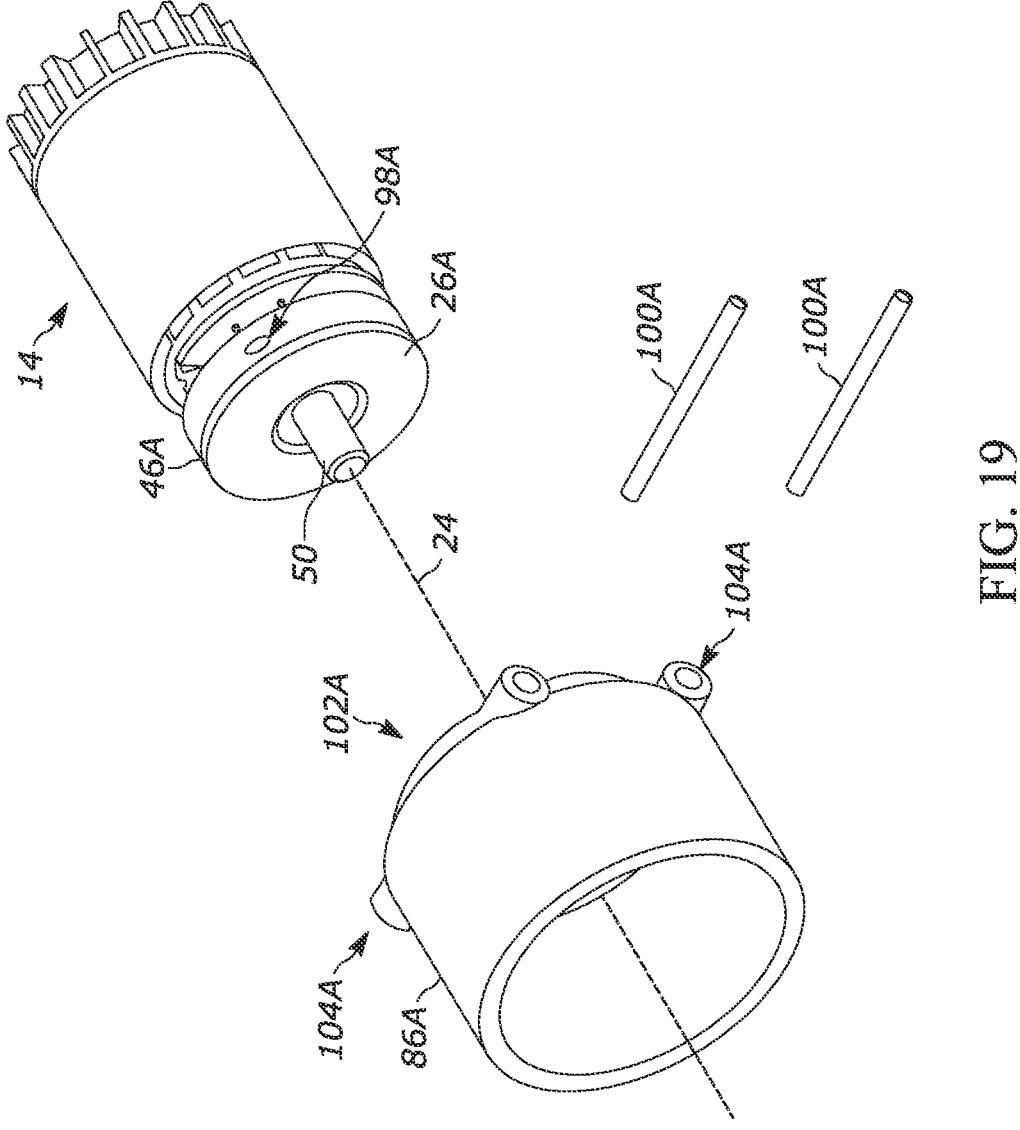
FIG. 19 is a partially exploded perspective view of an electric motor and a gear case according to another embodiment.
Figure 20A:
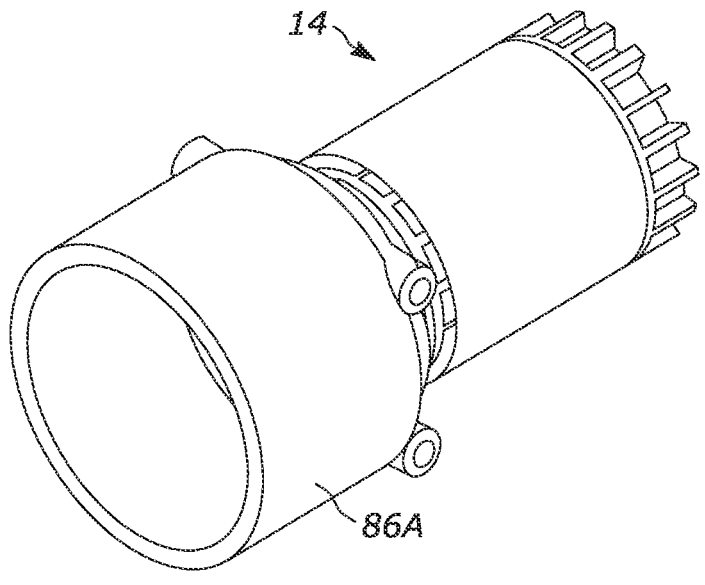
FIGS. 20A and 20B are perspective views of the electric motor and the gear case of FIG. 19 coupled to each other.
Figure 20B:
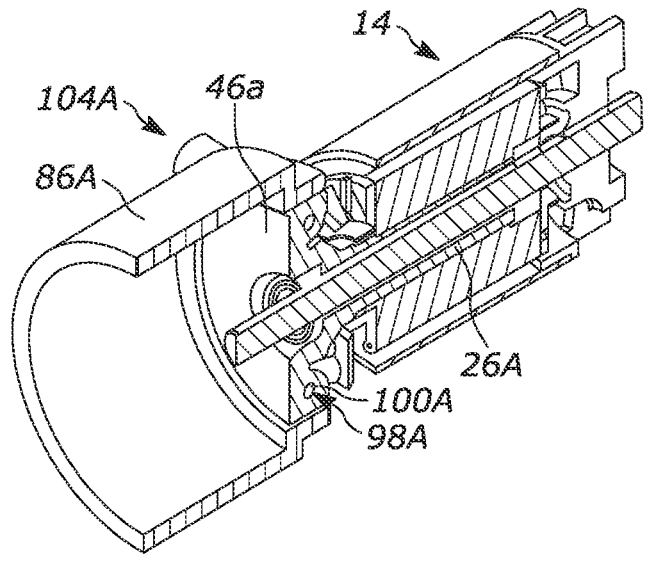

With reference to FIGS. 19-20B, an alternative embodiment of the motor 14 can include a modified stator mount 26A having a modified motor support portion 46A. That is, the modified stator mount 26A can include a stator support portion 44 that is identical to that of the stator mount 26, but a modified motor support portion 46A that is configured to mount to an alternative gear case 86A by a different means. The motor support portion 46A is disk-shaped and includes, in the illustrated embodiment, two apertures 98A extending transverse to the axis 24 and parallel to one another. The two apertures 98A receive two corresponding pins 100A therein. In some embodiments, the pins 100A may be spring pins 100A that are retractable and extendable along their length. The gear case 86A includes a front opening 102A that receives the disk-shaped motor support portion 46A (e.g., by a nominal slip-fit). The gear case 86A further includes pin bosses 104A that are shaped and positioned to receive the end portions of the pins 100A. The pins 100A extend through the apertures 98A and into the pin bosses 104A to releasably secure the motor support portion 46A to the gear case 86A.

Figure 21:
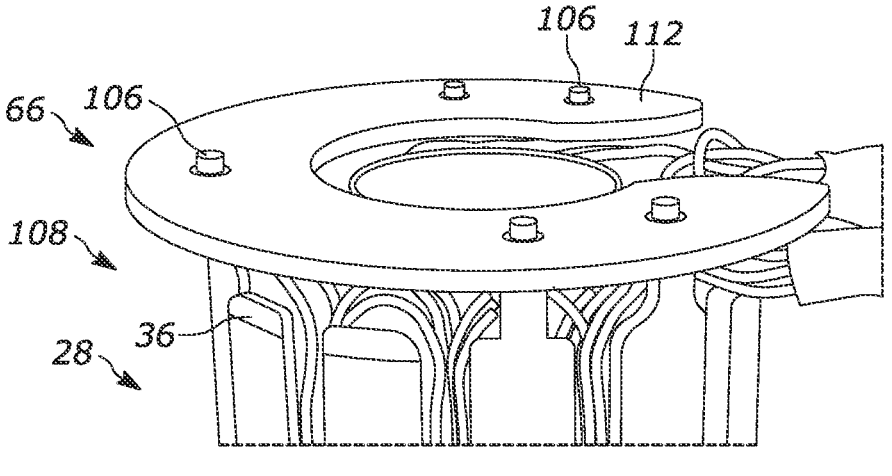
FIG. 21 is a perspective view illustrating a method for coupling a printed circuit board assembly (PCBA) to the stator of FIG. 7.
Figure 21:
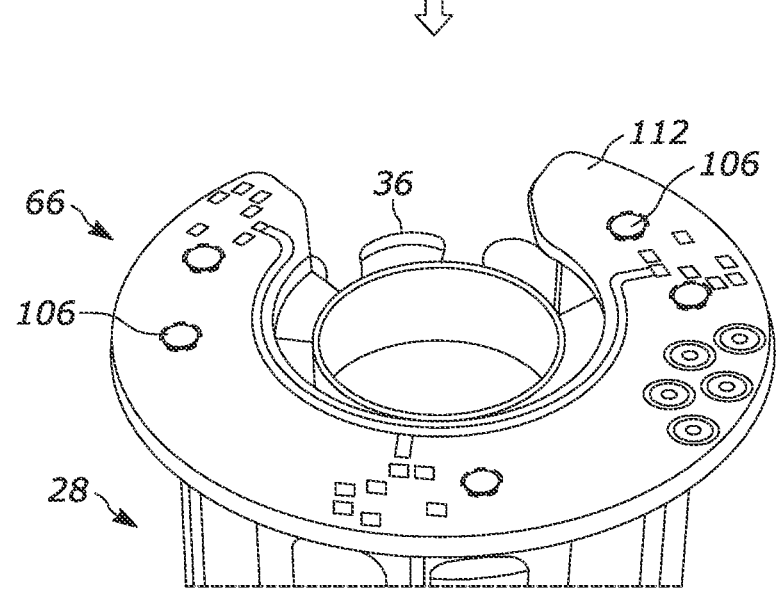

FIG. 21 illustrates a two-step process for securing the PCBA 66 to the insulator 36 of the stator core assembly 28. As shown in FIG. 21 and also in FIG. 8, the insulator 36 includes a plurality of axially extending posts or standoffs 106 (e.g., five standoffs 106 in the illustrated embodiment) protruding at a first axial end 108 thereof. That is, the stator core assembly 28 includes a first axial end 108 and a second axial end 110 (FIG. 8) located opposite from the first axial end 108, with the PCBA 66 being coupled to the first axial end 108. The PCBA 66 includes a circuit board 112 with a plurality of corresponding through holes 114 (e.g., five through holes 114 in the illustrated embodiment) that receive the standoffs 106 of the insulator 36. The standoffs 106 are located at an outermost periphery of the insulator 36 and extend from posts 116 that are larger in diameter than the standoffs 106. As such, a shoulder 117 (FIGS. 8 and 27) is defined between the standoffs 106 and the posts 116. The shoulder 117 abuts a first surface of the PCBA 66 to axially locate the PCBA 66 in relation to the insulator 36. As shown in FIG. 21, during assembly, the PCBA 66 can first be placed upon the insulator 36 with the standoffs 106 extending through the through holes 114 and beyond an opposite second surface of the PCBA 66. Thereafter, the protruding ends of the standoffs 106 can be subsequently compressed or punched to deform against the second surface of the PCBA 66. The deformed ends of the standoffs 106 become flanges that are larger in diameter than the through holes 114 to hold the PCBA 66 in place against the insulator 36. The standoffs 106, and the corresponding through holes 114, can be oriented in a pattern (e.g., an asymmetrical pattern) such that the through holes 114 will receive the standoffs 106 in only one possible orientation of the PCBA 66 relative to the insulator 36. Such a pattern arrangement of the standoffs 106 and the through holes 114 will clock the PCBA 66 relative to the insulator 36 to ensure proper installation during assembly.

Figure 22A:
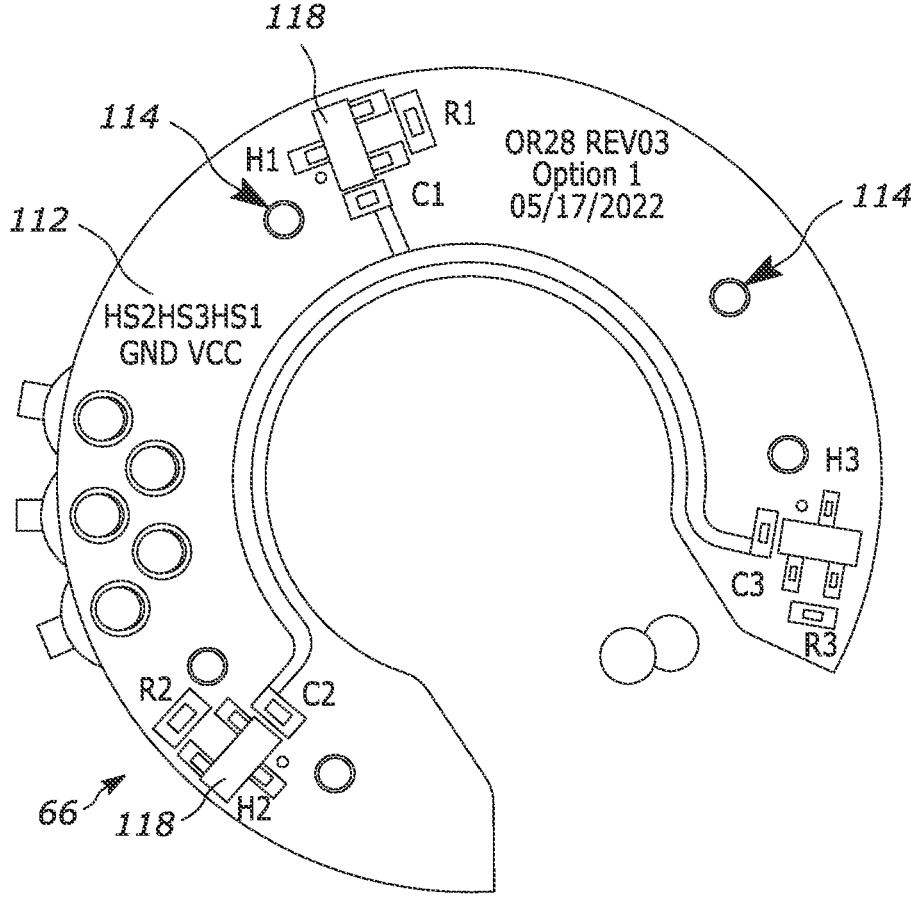
FIG. 22A is a front view of the PCBA of FIG. 21.

With reference to FIG. 22A, in one embodiment, the circuit board 112 of the PCBA 66 has an annular, arc-shape with an open center and extending approximately 315 degrees about its origin point, or, about the axis 24 when the PCBA 66 is coupled to the stator 20. The PCBA 66 also includes three position sensors 118 (e.g., magnetic sensors such as Hall-effect sensors) provided on the first surface of the circuit board 112 and angularly spaced apart from one another at equal intervals of 120 mechanical degrees. The five through holes 114 also extend through the circuit board 112 in an asymmetric pattern.

Figure 22B:
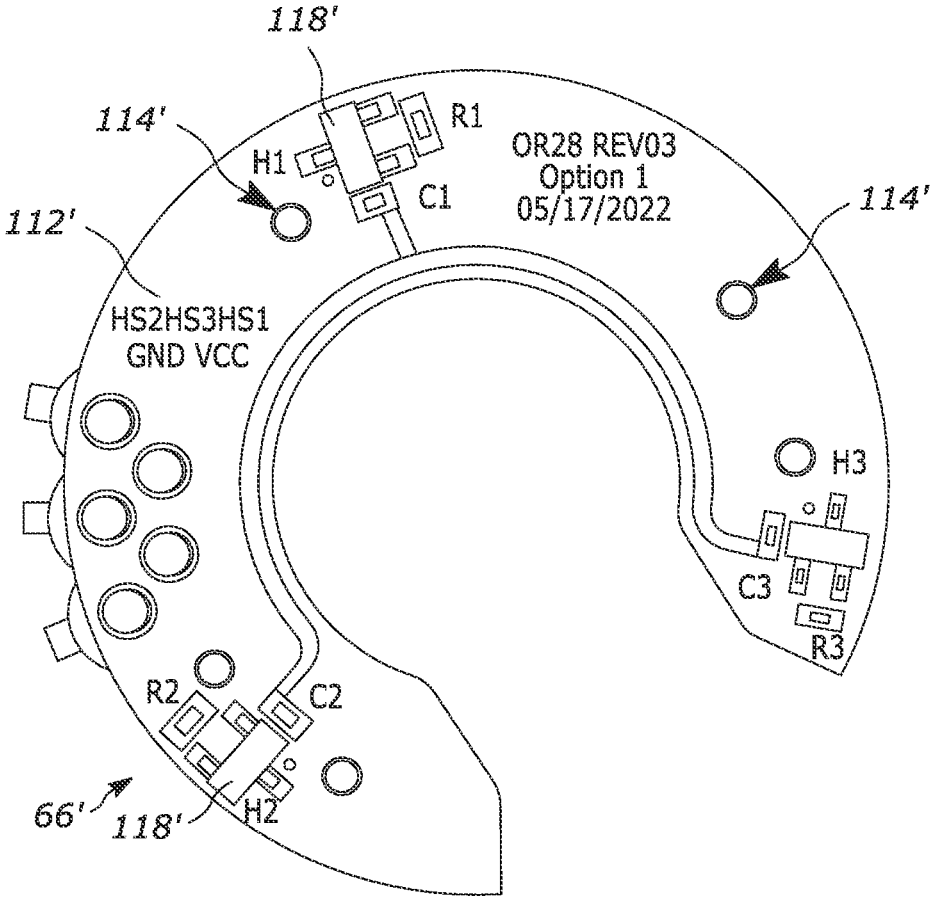
FIG. 22B is a front view of a PCBA according to another embodiment.

FIG. 22B illustrates another embodiment of a PCBA 66' that is substantially similar to the PCBA 66 of FIG. 22A but differs with respect to the positions of the position sensors 118' as compared to the PCBA 66. Specifically, the position sensors 118' are shifted by three mechanical degrees as compared to the position sensors 118, or relative to the through holes 114'. Since the stator 20 of the motor 14 includes twelve coils 32 and three phases, this three-degree mechanical shift of the position sensors 118' is equivalent to a fifteen-degree electrical phase shift.

Figure 23:
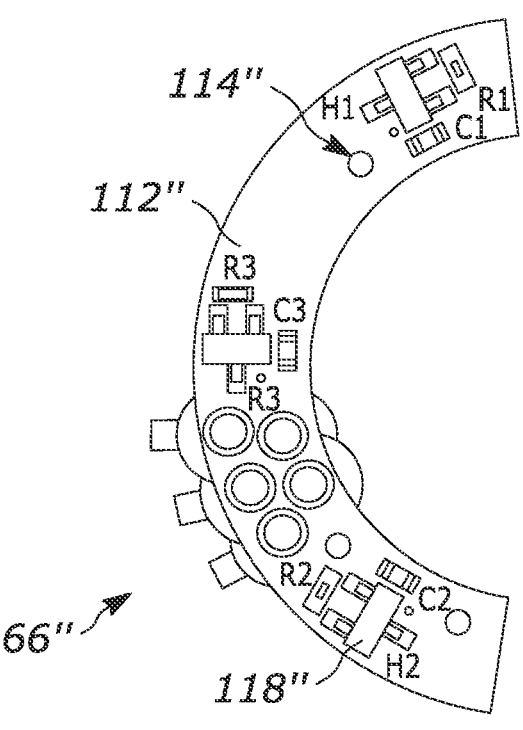
FIG. 23 is a front view of a PCBA according to another embodiment.

FIG. 23 illustrates another embodiment of a PCBA 66" operable with the motor 14. The PCBA 66" includes an annular, arc-shaped circuit board 112" that extends approximately 170 degrees about its origin point, or, about the axis 24 when the PCBA 66" is coupled to the stator 20. The PCBA 66" also includes three position sensors 118" that are angularly spaced apart from one another by intervals of approximately 60 degrees, and through holes 114".

Figure 24A:
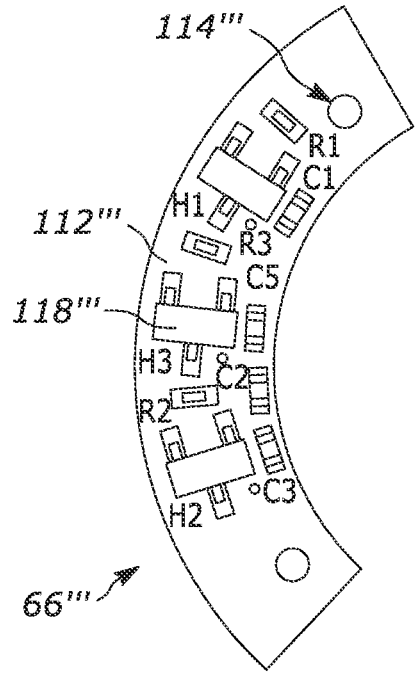
FIGS. 24A and 24B are front and rear views, respectively, of a PCBA according to another embodiment.
Figure 24B:
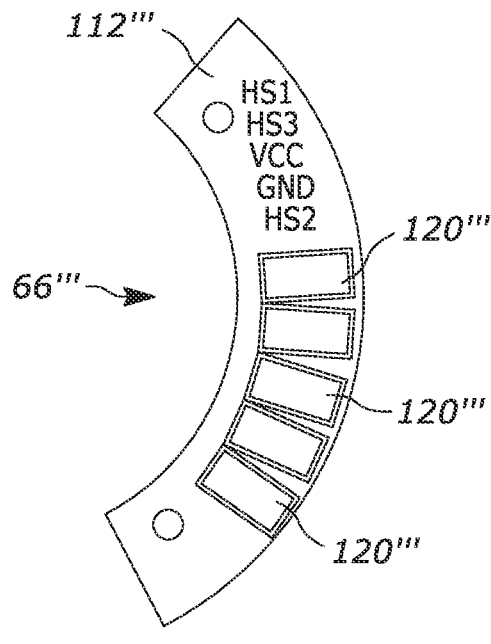

FIGS. 24A and 24B illustrate another embodiment of a PCBA 66''' operable with the motor 14. The PCBA 66''' includes an annular, arc-shaped circuit board 112''' that extends approximately 115 degrees about its origin point, or, about the axis 24 when the PCBA 66''' is coupled to the stator 20. In other embodiments, the PCBA 66''' can extend less than 180 degrees about the axis 24 to maintain a compact arrangement. The PCBA 66" also includes three position sensors 118''' located on the first side (FIG. 24A) and angularly spaced apart from one another by intervals of approximately 24 mechanical degrees. In addition, the circuit board 112''' includes two through holes 114''' for receiving two of the standoffs 106 (FIG. 21). Due to the relatively shorter angular extent of the circuit board 112''', space is constrained as compared to the circuit boards 112, 112', and 112''' described herein. Accordingly, the circuit board 112''' does not include soldering pads, such as those shown in FIGS. 22A-23, for receiving and connecting to voltage, ground, and/or signal wires. With reference to FIG. 24B, the second side of the circuit board 112''' includes a plurality of soldered through-hole (SMT) pads 120''' (e.g., five SMT pads 120''' in the illustrated embodiment) for connecting to separate wires.

Figure 25:
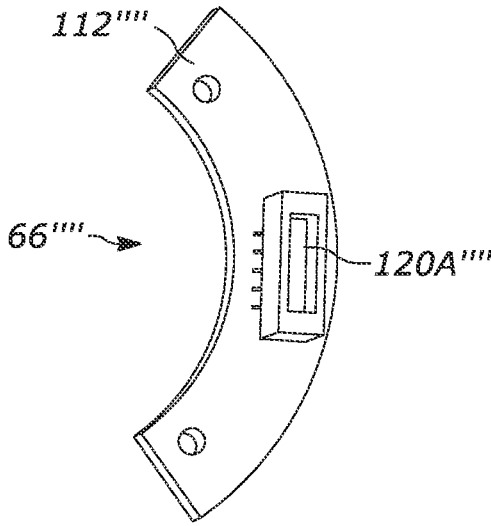
FIG. 25 is a rear view of a PCBA according to another embodiment.

FIG. 25 illustrates a second side of an alternative PCBA 66'''' that is substantially similar to the PCBA 66''', but which does not include SMT pads on the second side thereof. Instead, the PCBA 66'''' includes an SMT connector 120A'''' coupled to the second side of the circuit board 112'''' that can selectively and removably couple to a corresponding wire connector (not shown).

Figure 26:
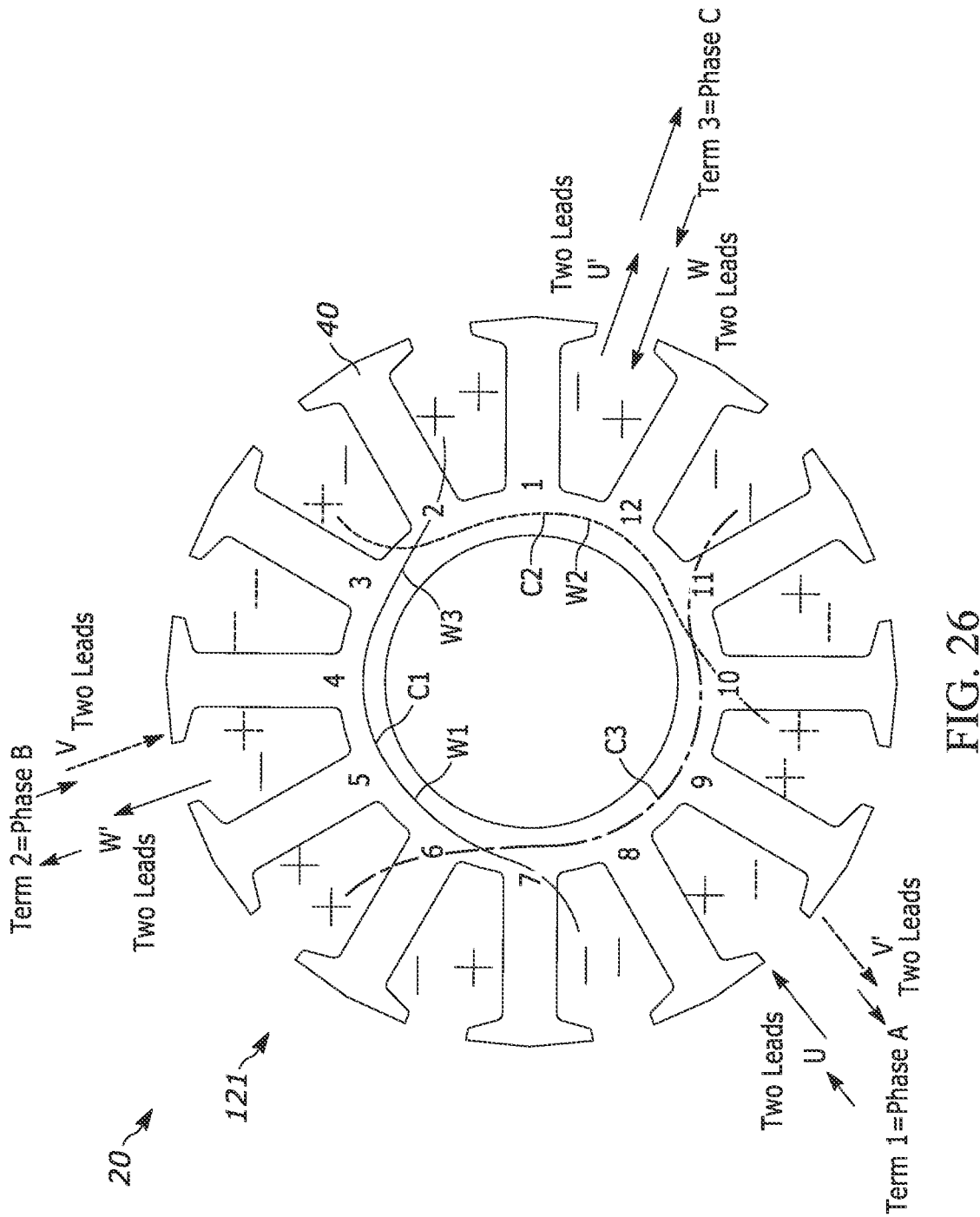
FIG. 26 is a schematic view illustrating a winding arrangement of the stator of FIG. 7.

FIG. 26 schematically illustrates a three-phase winding arrangement 121 for the stator 20 according to an embodiment of the present disclosure. Each of the twelve teeth 40 is assigned a reference number, 1-12 in counterclockwise order, which is representative of the coil 32 (FIG. 8) formed about each respective tooth. As shown in FIG. 26, tooth 1 supports coil 1, tooth 2 supports coil 2, and so on with tooth 12 supporting coil 12. The twelve coils 1-12 are formed by three windings W1, W2, and W3, with each winding W1-W3 forming four coils of the coils 1-12, respectively. For example, coils 1, 2, 7, and 8, which are positioned on the teeth 1, 2, 7, and 8, respectively, are all formed by the first winding W1. The winding W1 represents one or more strands of continuous insulated wire that begins at a start lead U and successively and continuously forms the coils 8, 7, 2, and 1, and then terminates at an end lead U'. Similarly, the winding W2 begins at a start lead V and continuously forms the coils 4, 3, 10, and 9, and then terminates at an end lead V'. The winding W3 begins at a start lead W and continuously forms the coils 12, 11, 6, and 5, and then terminates at an end lead W'. Each of the windings W1-W3 include some connecting segments or crossover portions C1-C3, respectively, that extend circumferentially about portions of the stator 20 to connect oppositely located coils. For example, the winding W1 includes crossover portion C1 that extends about a portion of the inner circumference of the stator 20 to connect coil 7 with coil 2.

In the illustrated embodiment, each winding W1-W3 is really formed by two strands of continuous wire that run essentially beside or over/under one another as they form the respective coils 1-12. For example, the winding W1 is formed by two wires, with each of the two wires extending separately but continuously to form the coil 8, the coil 7, the crossover portion C1, the coil 2, and the coil 1. Accordingly, the start lead U actually includes two wire ends or leads, of each of the two continuous wire strands, and the end lead U' likewise includes two district leads. Accordingly, the entire winding arrangement 121 for the stator 20 depicted in FIG. 26 includes twelve leads, four each for the start and end leads U and V', the start and end leads V and W', and the start and end leads W and U'. By utilizing two separate and continuous wire strands to form each winding W1-W3, a small diameter wire can be used, which allows the space between and around the teeth 40 to be utilized more efficiently.

Figure 27:
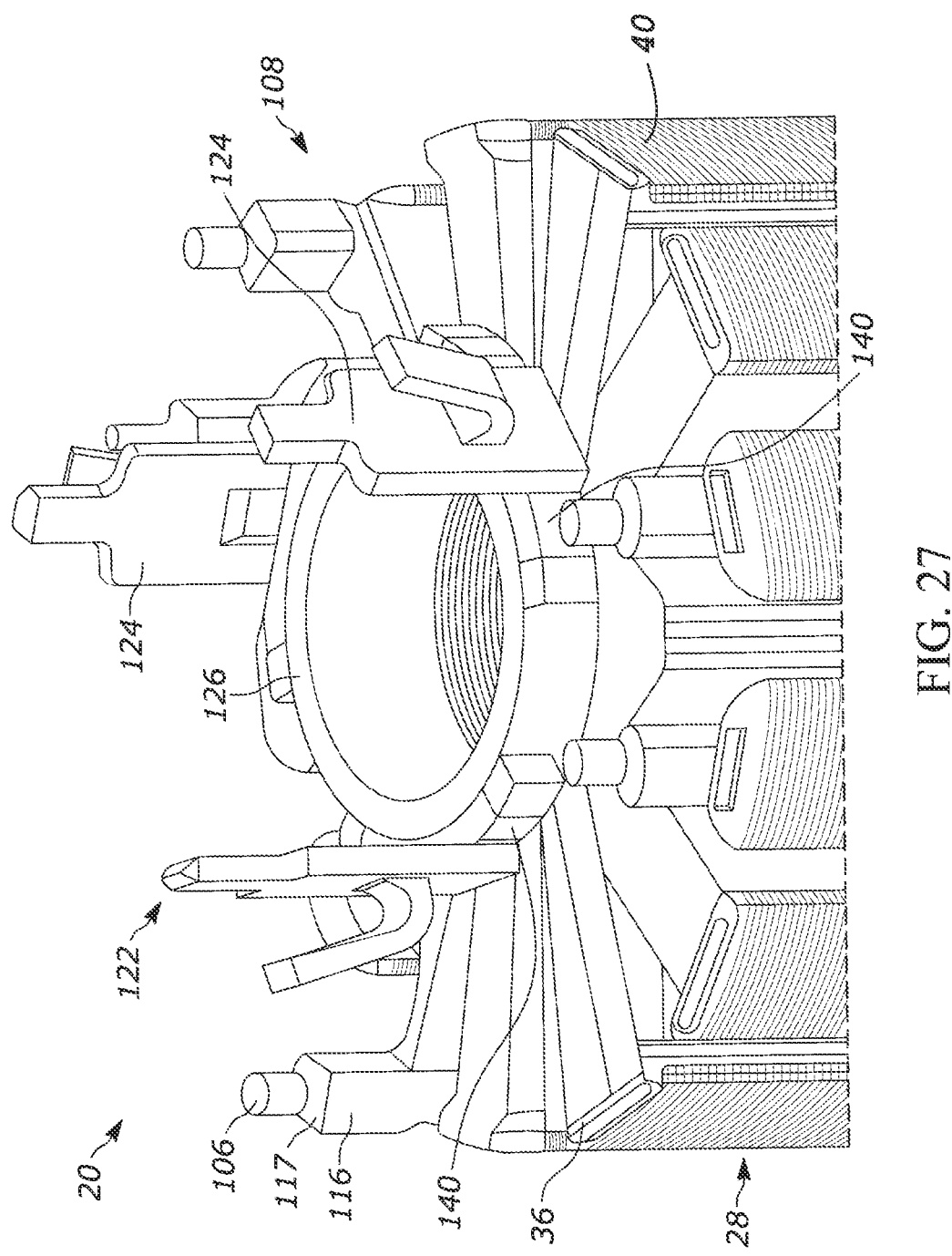
FIG. 27 is a perspective view of a terminal arrangement of the stator of FIG. 7.
Figure 28:
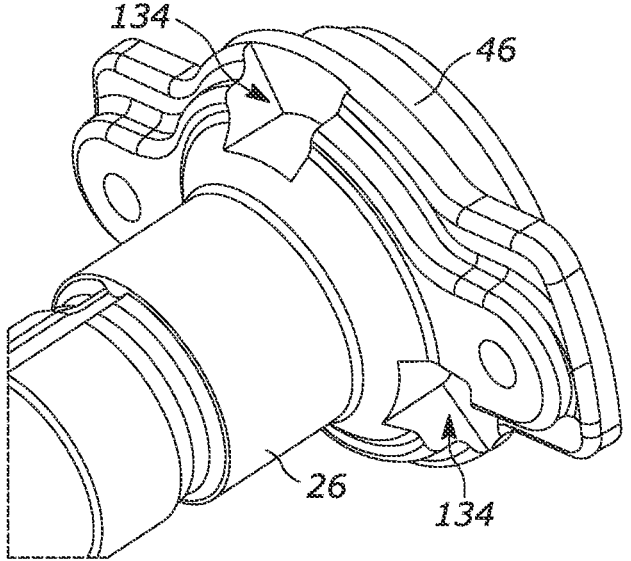
FIG. 28 is a perspective view of a stator mount of the stator of FIG. 7.
Figure 29:
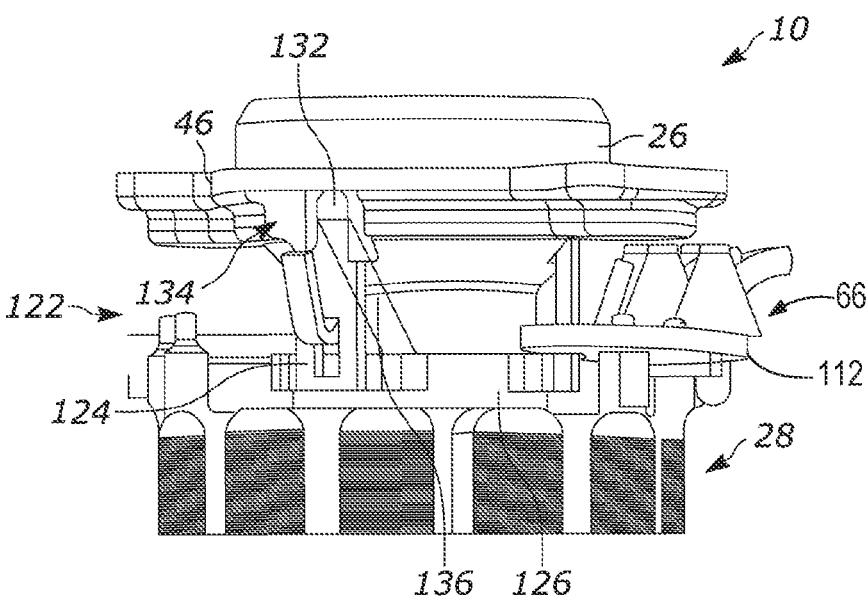
FIG. 29 is a partial perspective view of the stator of FIG. 7.

With reference to FIGS. 27-29, the stator 20 can include a terminal arrangement 122 for connecting the coils 32, including the start and end leads U, U', V, V', W, and W' shown in FIG. 26, to one or more sources of electrical power. The terminal arrangement 122 includes three conductive terminals 124 supported by the insulator 36 at the first axial end 108 of the stator core assembly 28.

Figure 30:
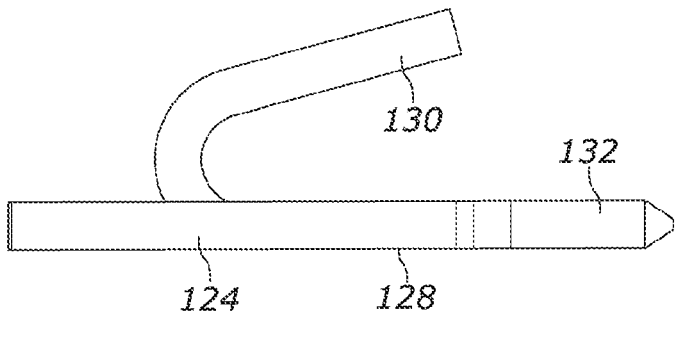
FIGS. 30 and 31 are side and perspective views, respectively, of a terminal of the terminal arrangement of FIG. 27.
Figure 31:
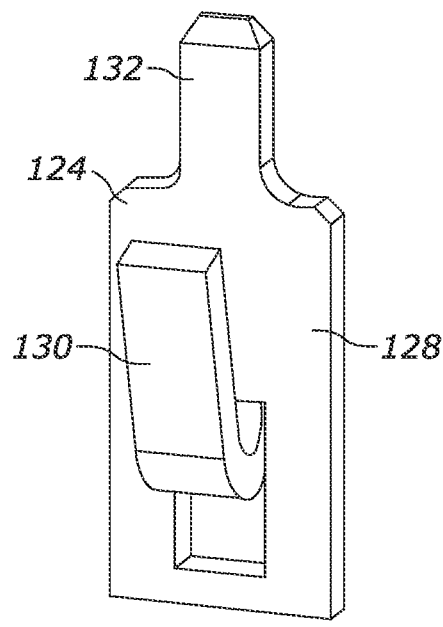

With reference to FIGS. 30 and 31, each terminal 124 is formed from a conductive material (e.g., metal or metal alloy) and includes a base portion 128, a tang 130 protruding from the base portion 128, and a connection portion 132 extending from the base portion 128. In some embodiments, terminal 124 can be formed as a stamping cut from a metal sheet and bent into shape. Each connection portion 132 extends away from the base portion 128 in the axial direction, and each tang 130 extends away from the base portion 128 both in the axial direction and in a radial direction when arranged on the stator 20. Each terminal 124 can include a thickness of approximately 0.6 millimeters (mm), and each tang can include a length of approximately 3.0 mm.

As shown in FIG. 27, the insulator 36 of the stator core assembly 28 includes a cylindrical end wall 126 extending about an inner circumference of the insulator 36 and protruding axially outward at the first axial end 108. The end wall 126 is positioned radially inward from the teeth 40 and supports the terminals 124, which are mounted thereto. In the illustrated embodiment, the base portion 128 of each terminal 124 is affixed to an annular mount 140, and the mount 140 is affixed to a section of the end wall 126. In other embodiments (not shown), the terminals 124 may be mounted directly to the end wall 126 itself, e.g., via a molding process.

As discussed in connection with FIG. 26, each winding W1-W3 includes two continuous wires each having a start lead and an end lead, for a total of four leads per winding W1-W3 and twelve total leads in the winding arrangement 121. The tang 130 of each terminal 124 receives and electrically connects four respective leads of the windings W1-W3.

With reference to FIGS. 28 and 29, the terminals 124 protrude axially outward beyond the end wall 126 and toward the motor support portion 46 of the stator mount 26. Accordingly, the motor support portion 46 can include a plurality of cutouts 134 corresponding to the locations of the terminals 124 to provide clearance for the axial extent of the terminals 124. As shown in FIG. 29, a power wire 136 can be electrically connected to the connection portion 132 of the terminal 124 in a region generally within the cutout 134. As further illustrated in FIG. 29, the circuit board 112 of the PCBA 66 is annular in shape and extends about the axis 24. The circuit board 112 is positioned radially outward from the terminals 124. In addition, the circuit board 112 extends about at least two terminals 124.

Figure 32:
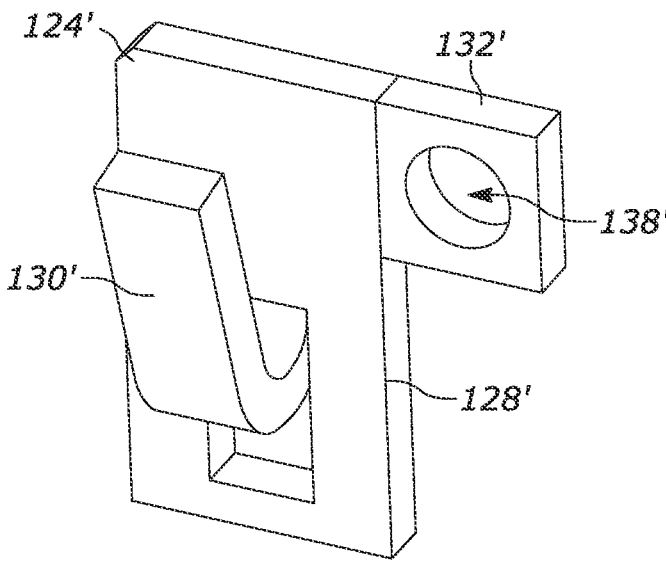
FIG. 32 is a perspective view of a terminal of the terminal arrangement of FIG. 27 according to another embodiment.

FIG. 32 shows an alternative embodiment of a terminal 124' that can be used in the terminal arrangement 122 in place of the terminals 124. The terminal 124' is similar to the terminal 124, having a base portion 128' and a tang 130', but includes a connection portion 132' that protrudes laterally away from the base portion 128' rather than axially away therefrom. In addition, the connection portion 132' includes a through hole 138' that can receive a wire end of a power wire, such as the power wire 136 (FIG. 29), to facilitate soldering thereto.

Figure 33:
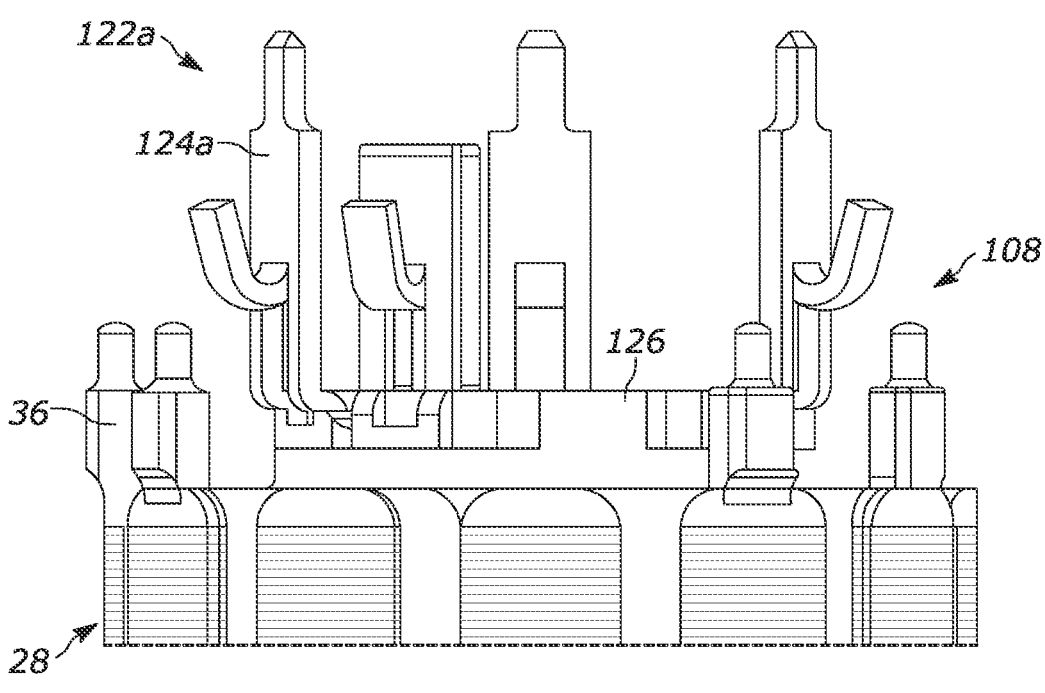
FIG. 33 is a partial side view of a terminal arrangement of the stator of FIG. 7 according to another embodiment.
Figure 34:
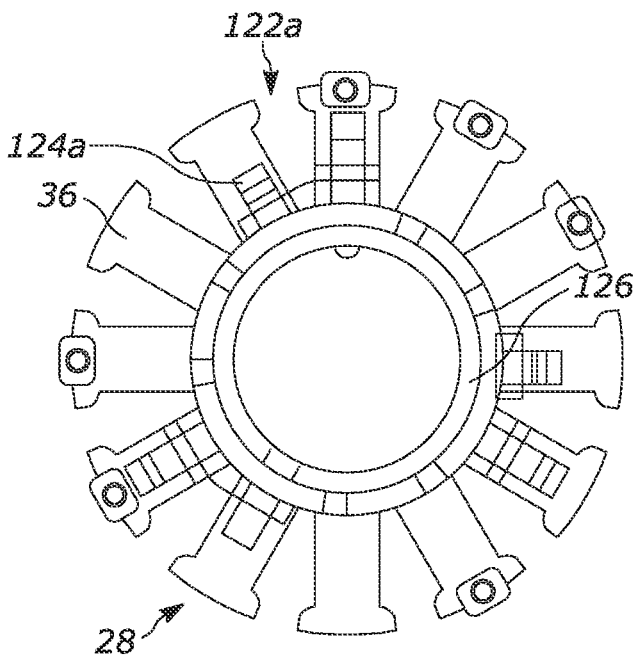
FIG. 34 is a top view of the terminal arrangement of FIG. 33.
Figure 35:
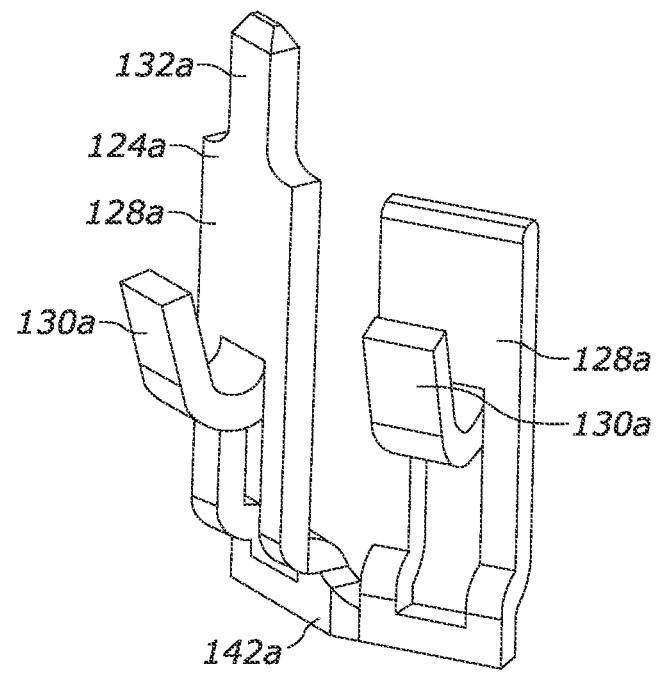
FIG. 35 is a perspective view of a terminal of the terminal arrangement of FIG. 33.

FIGS. 33-35 illustrate another embodiment of a terminal arrangement 122a for connecting the coils 32 to one or more sources of electrical power. The terminal arrangement 122a is similar to the terminal arrangement 122 but differs with respect to the shapes of the three terminals 124a. That is, each terminal 124a includes not one, but two base portions 128a, with a tang 130a extending away from each base portion 128a for a total of two tangs 130a per terminal 124a. A connection portion 132a extends axially away from only one of the two base portions 128a, such that each terminal 124a includes only one connection portion 132a. The two base portions 128a are connected to one another by a bridge portion 142a. The three terminals 124a are mounted to the end wall 126 of the insulator 36 in a manner similar to that described above with respect to the terminal arrangement 122.

Each terminal 124a includes two tangs 130a, for a total of six tangs 130a in the terminal arrangement 122a. Accordingly, to achieve the winding arrangement 121 illustrated in FIG. 26, each tang 130a in the terminal arrangement 122a receives and electrically connects to two respective leads of the windings W1-W3. This simplifies the winding process as compared to the terminal arrangement 122 by requiring fewer lead connections per tang 130a.

Figure 36:
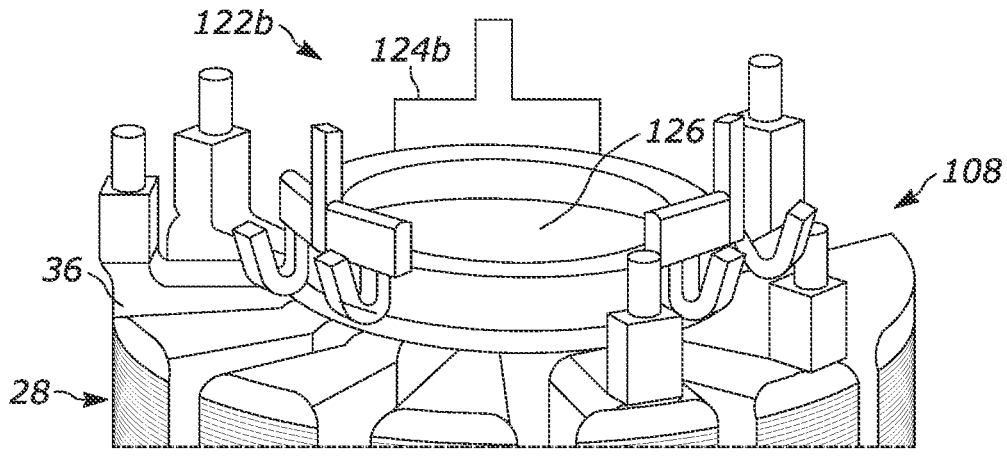
FIG. 36 is a perspective view of a terminal arrangement of the stator of FIG. 7 according to another embodiment.
Figure 37:
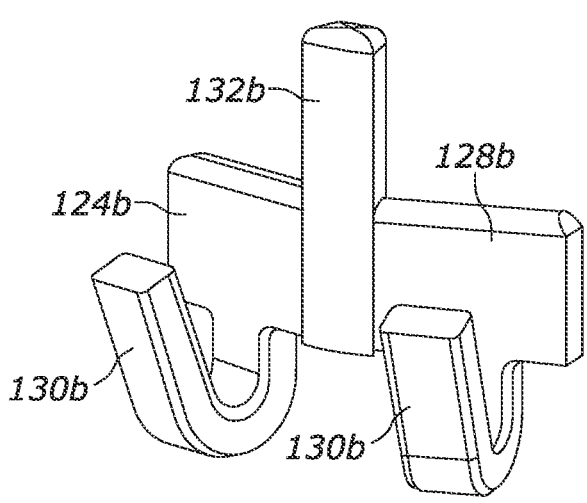
FIGS. 37 and 38 are perspective views of a terminal of the terminal arrangement of FIG. 36.

FIGS. 36 and 37 illustrate another embodiment of a terminal arrangement 122b for connecting the coils 32 to one or more sources of electrical power. The terminal arrangement 122b is similar to the terminal arrangement 122a but differs with respect to the shapes of the three terminals 124b. Specifically, each terminal 124b includes a base portion 128b and two tangs 130b that protrude axially downward from the base portion 128b initially, and then bend both radially outward and back axially upward before terminating at their distal ends. The terminals 124b each further include a single connection portion 132b extending axially upward from the base portion 128b opposite from the tangs 130b. The three terminals 124b are mounted to the end wall 126 of the insulator 36 in a manner similar to that described above with respect to the terminal arrangement 122.

Each terminal 124b includes two tangs 130b, for a total of six tangs 130b in the terminal arrangement 122b. Accordingly, to achieve the winding arrangement 121 illustrated in FIG. 26, each tang 130b in the terminal arrangement 122b receives and electrically connects to two respective leads of the windings W1-W3. This simplifies the winding process as compared to the terminal arrangement 122 by requiring fewer lead connections per tang 130b.

Figure 38:
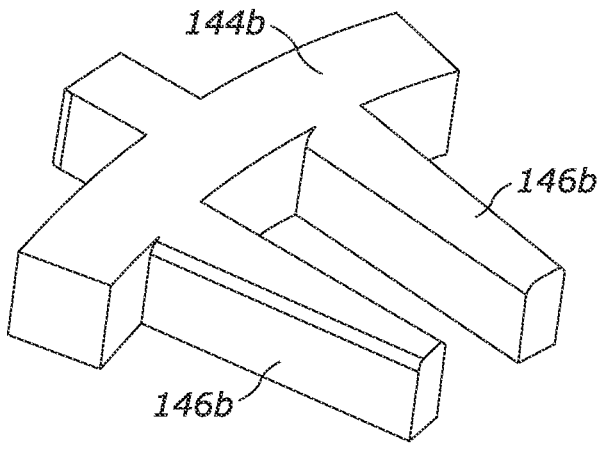

FIG. 38 illustrates a stamping 144b that can be cut from sheet metal and subsequently bent into shape to form the terminal 124b shown in FIG. 37. Specifically, the legs 146b of the stamping 144b can be bent in the direction of the arrows shown in FIG. 38 to form the tangs 130b.

Figure 39:
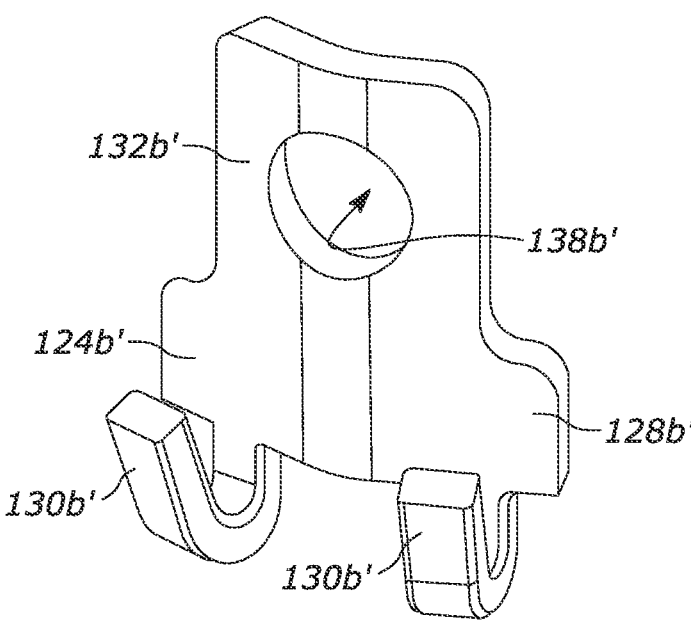
FIG. 39 is a perspective view of a terminal of the terminal arrangement of FIG. 36 according to another embodiment.

FIG. 39 illustrates an alternative embodiment of a terminal 124b' that can be substituted for the terminal 124b within the terminal arrangement 122b. The terminal 124b' differs from the terminal 124b in that the connection portion 132b' is larger than the connection portion 132b and defines a through hole 138b' that can receive a wire end of a power wire, such as the power wire 136 (FIG. 29), to facilitate soldering thereto.

FIGS. 40-43 illustrate another embodiment of a terminal arrangement 122c for connecting the coils 32 to one or more sources of electrical power. The terminal arrangement 122c includes a commutator ring 148c that includes a plurality of terminals 124c arranged within a ring structure and spaced apart from one another by equal intervals. Specifically, the commutator ring 148c includes twelve terminals 124c that are connected to one another by twelve insulating segments 150c, such that together the terminals 124c and the insulating segments 150c form a ring shape. In other embodiments (not shown) the terminals A can be supported by a continuous molded ring, or alternatively, the terminals 124c can be supported by the end wall 126 itself. In the illustrated embodiment, the commutator ring 148c is affixed to an outer surface of the end wall 126 with each terminal 124c aligned with a corresponding tooth 40. Although not shown in FIGS. 40-43, when the PCBA 66 is coupled to the insulator 36, the circuit board 112 is positioned radially outward from the commutator ring 148c including the terminals 124c. In addition, the circuit board 112 extends about at least two terminals 124c.

Each terminal 124c includes a base portion 128c coupled to adjacent insulating segments 150c, and a tang 130c. The tang 130c protrudes axially downward from the base portion 128c initially, and then bends both radially outward and back axially upward before terminating at its distal end. In some embodiments, such as that shown in FIG. 41, the terminals 124c each further include a single connection portion 132c extending axially upward from the base portion 128c opposite from the tang 130c.

In total, the commutator ring 148c includes twelve tangs 130c. Accordingly, to achieve the winding arrangement 121 illustrated in FIG. 26, each tang 130c in the terminal arrangement 122c receives and electrically connects to one respective lead of the windings W1-W3. This simplifies the winding process as compared to the terminal arrangement 122 by requiring fewer lead connections per tang 130c.

Figure 41:
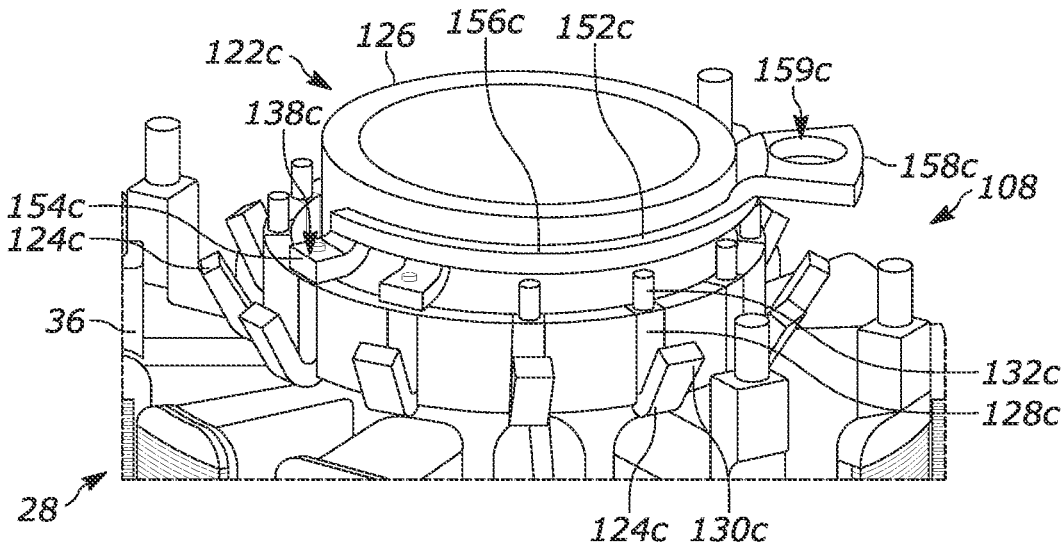
Figure 42:
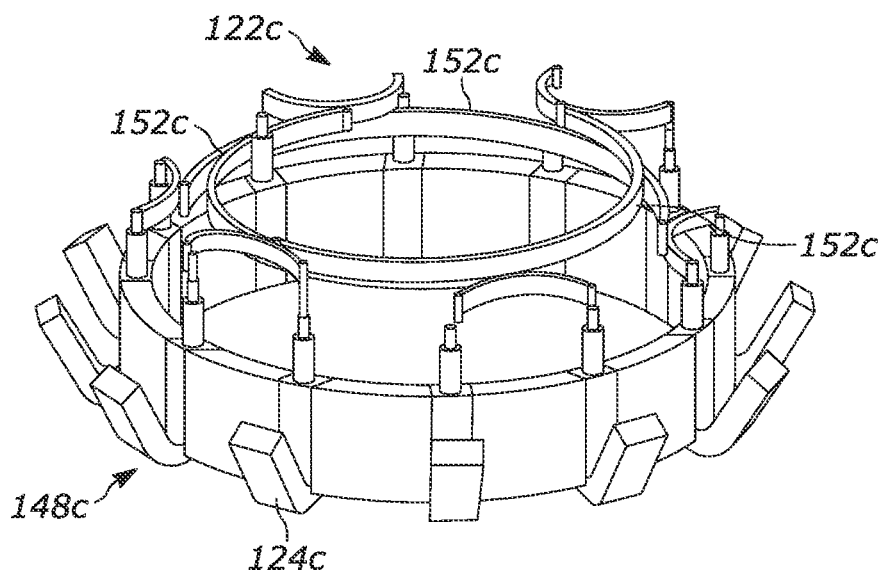

FIG. 41 also illustrates a bus bar 152c of the terminal arrangement 122c. The bus bar 152c is arc-shaped and includes four terminal connectors 154c that each connect to a respective connection portion 132c of four of the terminals 124c. Specifically, two of the terminal connectors 154c connect to two terminals 124c positioned adjacent one another on one side of the commutator ring 148c, and the other two terminal connectors 154c connect to two opposite terminals 124c positioned adjacent one another and opposite from the first two terminals 124c with respect to the central axis 24. Although only one bus bar 152c is shown in FIG. 41, FIG. 42 schematically illustrates that the terminal arrangement 122c includes three bus bars 152c, with each bus bar 152c connecting four terminals 124c including two opposite pairs of terminals 124c. FIG. 41 further illustrates that each terminal connector 154c of the bus bar 152c protrudes radially outward from a central arc segment 156c and includes a through hole 138c. The through hole 138c receives the connection portion 132c of a corresponding terminal 124c to form the electrical connection between the terminal 124c and the bus bar 152c. Each bus bar 152c further includes a power connector 158c that protrudes radially outward from the arc segment 156c and defines a power through hole 159c. The power through hole 159c can receive a wire end of a power wire, such as the power wire 136 (FIG. 29), to facilitate soldering thereto.

Figure 40:
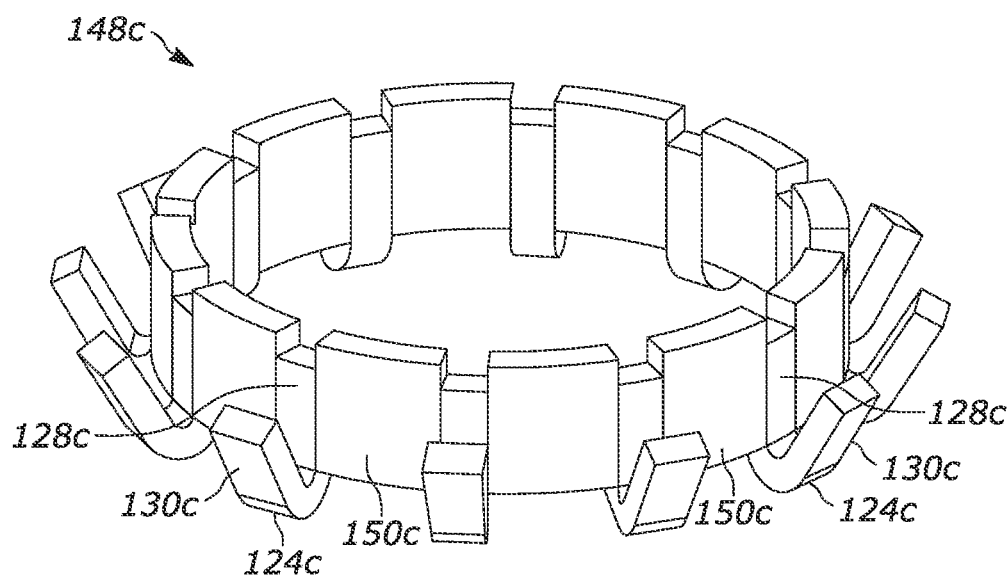
FIGS. 40, 41, and 42 are perspective views of a terminal arrangement of the stator of FIG. 7 according to another embodiment.
Figure 43:
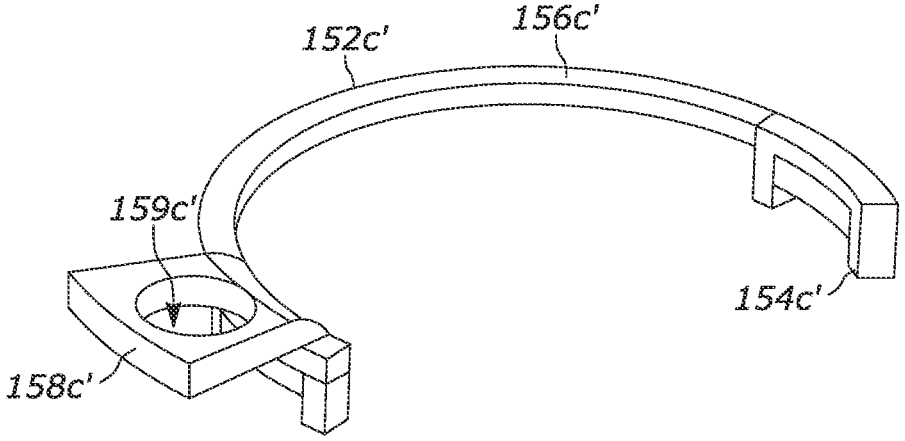
FIG. 43 is a perspective view of a bus bar of the terminal arrangement of FIGS. 40-42.

FIG. 43 illustrates another embodiment of a bus bar 152c' operable with the commutator ring 148c shown in FIG. 40. The bus bar 152c' is similar to the bus bar 152c of FIG. 42 but includes modified terminal connectors 154c' that do not include through holes. Instead, the terminal connectors 154c' protrude axially such that when the bus bar 152c' is coupled to the commutator ring 148c, the terminal connectors 154c' make facing contact with the base portions 128c the corresponding terminals 124c of the commutator ring 148c. Each bus bar 152c' further includes a power connector 158c' that protrudes radially outward from an arc segment 156c' and defines a power through hole 159c''.

Figure 44:
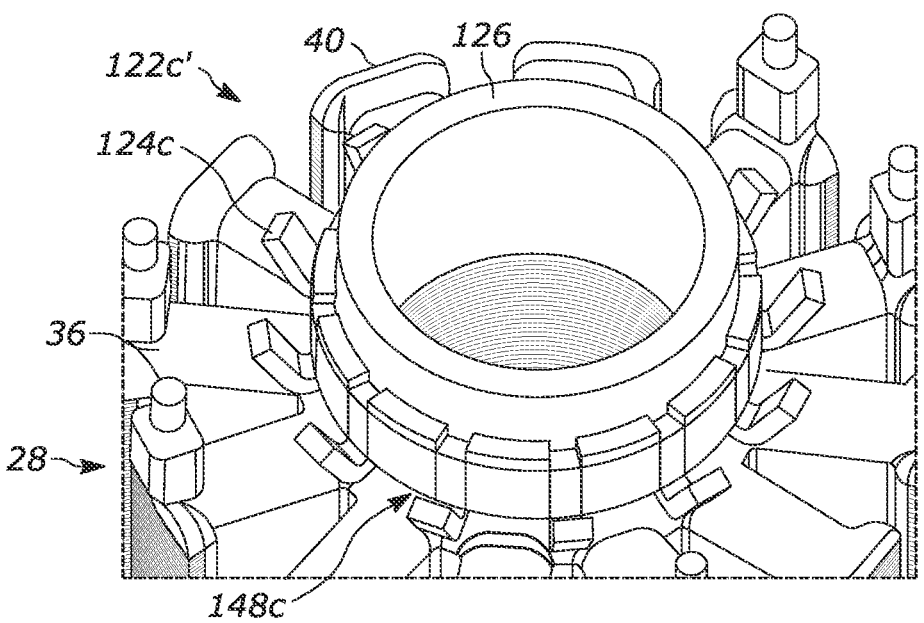
FIG. 44 is a perspective view of a terminal arrangement of the stator of FIG. 7 according to another embodiment.

FIG. 44 illustrates an alternative embodiment of a terminal arrangement 122c'. The terminal arrangement 122c is substantially similar to the terminal arrangement 122c and utilizes the same commutator ring 148c. However, the terminal arrangement 122c' differs from the terminal arrangement 122c with respect to the orientation of the terminals 124c relative to the teeth 40 of the stator core assembly 28. That is, in the terminal arrangement 122c', the commutator ring 148c is rotationally shifted relative to the terminal arrangement 122c so that the terminals 124c of the terminal arrangement 122c' are each aligned between two adjacent teeth 40. That is, the terminals 124c are aligned with the slot space defined between two adjacent teeth 40. This simplifies the winding process for the stator 20 when utilizing the terminal arrangement 122c' as compared to the terminal arrangement 122c and provides more space for accommodating the coils 32.

Figure 45:
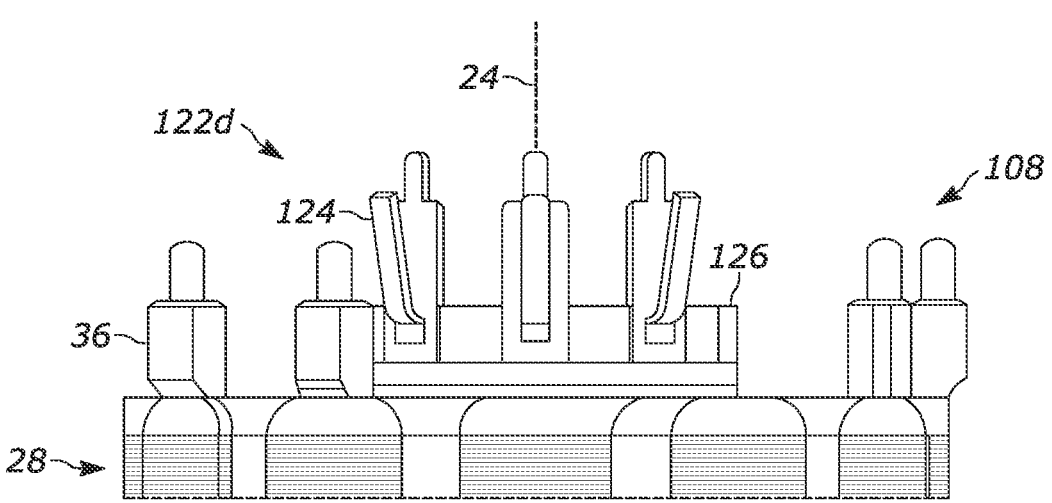
FIGS. 45 and 46 are perspective views of a terminal arrangement of the stator of FIG. 7 according to another embodiment.
Figure 46:
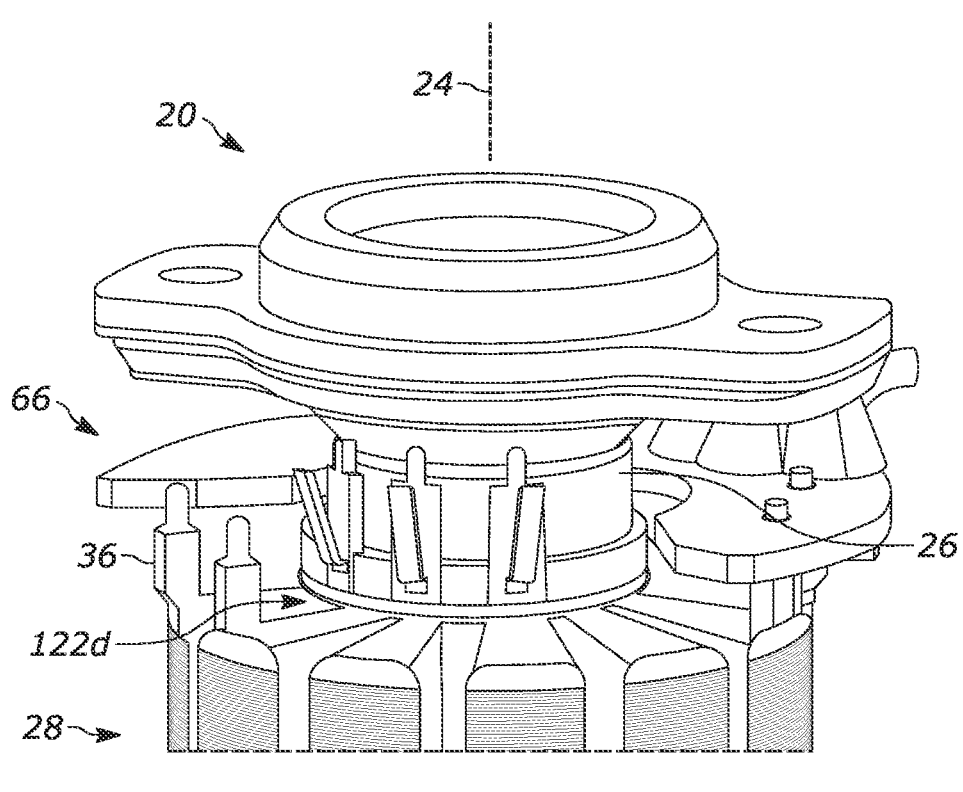

FIGS. 45 and 46 illustrate another embodiment of a terminal arrangement 122d for connecting the coils 32 to one or more sources of electrical power. The terminal arrangement 122d is similar to the terminal arrangement 122 shown in FIGS. 27-31 and utilizes the same terminals 124. However, the terminal arrangement 122d differs from the terminal arrangement 122 by locating the terminals 124 at different relative positions about the end wall 126. Specifically, the three terminals 124 in the terminal arrangement 122d are located in a grouping generally on one lateral side of the end wall 126 and are relatively closely spaced from one another. For example, the terminals 124 can be spaced from one another by approximately 20 degrees with respect to the axis 24. This arrangement provides relatively more space for the motor 14 to accommodate the PCBA 66 between the terminals 124, the insulator 36, and the stator mount 26. In particular, the PCBA's 66", 66''', and 66'''' described herein in connection with FIGS. 23-25B can be located generally opposite from the terminals 124 in this arrangement without interfering with the terminals 124 at all.

Figure 47:
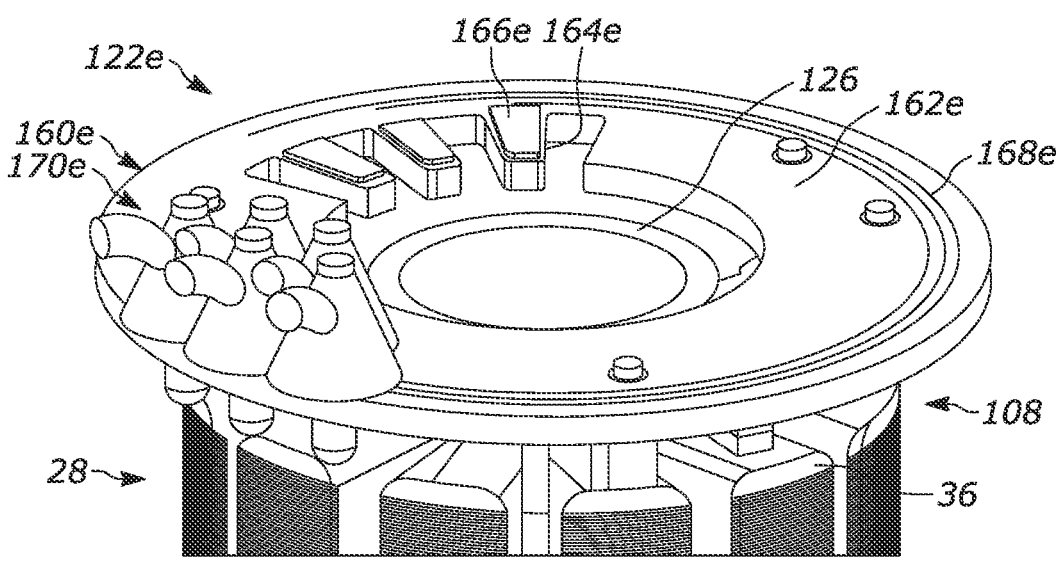
FIG. 47 is a perspective view of a terminal arrangement of the stator of FIG. 7 according to another embodiment.
Figure 48:
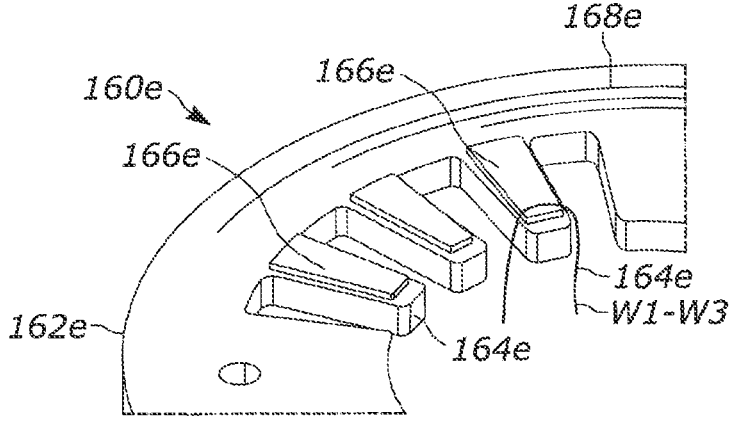
FIGS. 48 and 49 are partial perspective views of portions of a PCBA of the terminal arrangement of FIG. 47.
Figure 49:
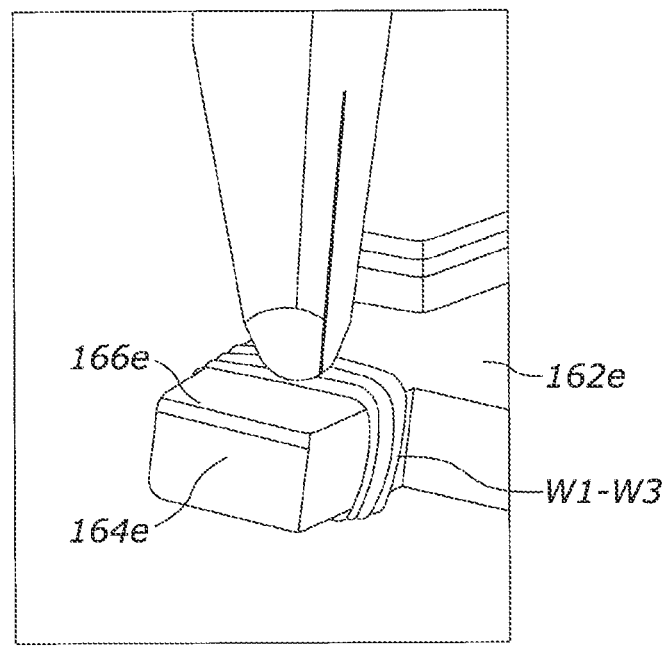

FIGS. 47-49 illustrate another embodiment of a terminal arrangement 122e for connecting the coils 32 to one or more sources of electrical power. The terminal arrangement 122e does not include distinct terminals affixed to the end wall 126. Instead, the terminal arrangement 122e includes a PCBA 160e with a generally annular or ring-shaped circuit board 162e having three integrally formed terminal structures or horns 164e. The horns 164e protrude toward a radially inner circumference of the circuit board 162e, and conductive pads 166e are located on the horns 164e. As shown in FIG. 48, the windings W1-W3 can be wrapped about the horns 164e to electrically connect the windings to the pads 166e on the horns 164e. As shown in FIG. 49, the windings W1-W3 can further be soldered to the pads 166e to form both mechanical and electrical connections therewith. The PCBA 160e further includes traces 168e extending between the pads 166e and power wire connectors 170e that are also located on the circuit board 162e. As such, PCBA 160e itself electrically connects the coils 32 to electrical power sources via the pads 166e, the traces 168e, and the power wire connectors 170e. This eliminates the need for separately formed terminals and thereby reduces the overall length of the electric motor 14.

Figure 50:
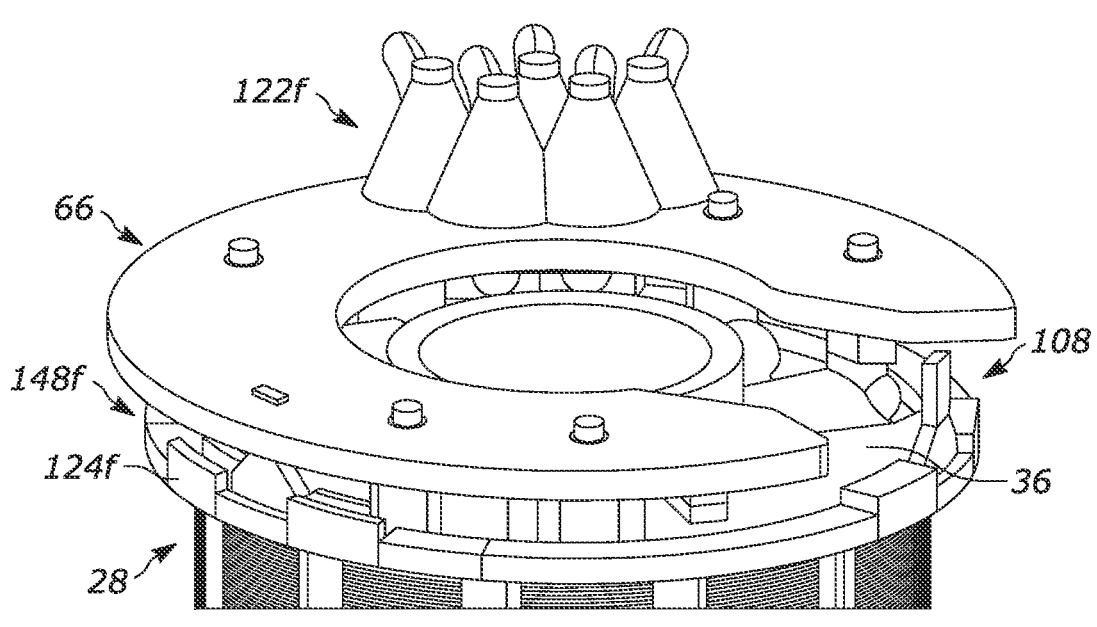
FIG. 50 is a perspective view of a terminal arrangement of the stator of FIG. 7 according to another embodiment.
Figure 51:
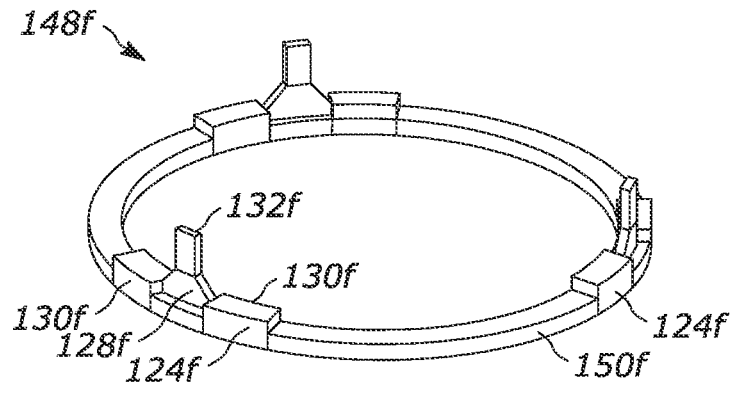
FIG. 51 is a perspective view of a commutator ring of the terminal arrangement of FIG. 50.
Figure 52:
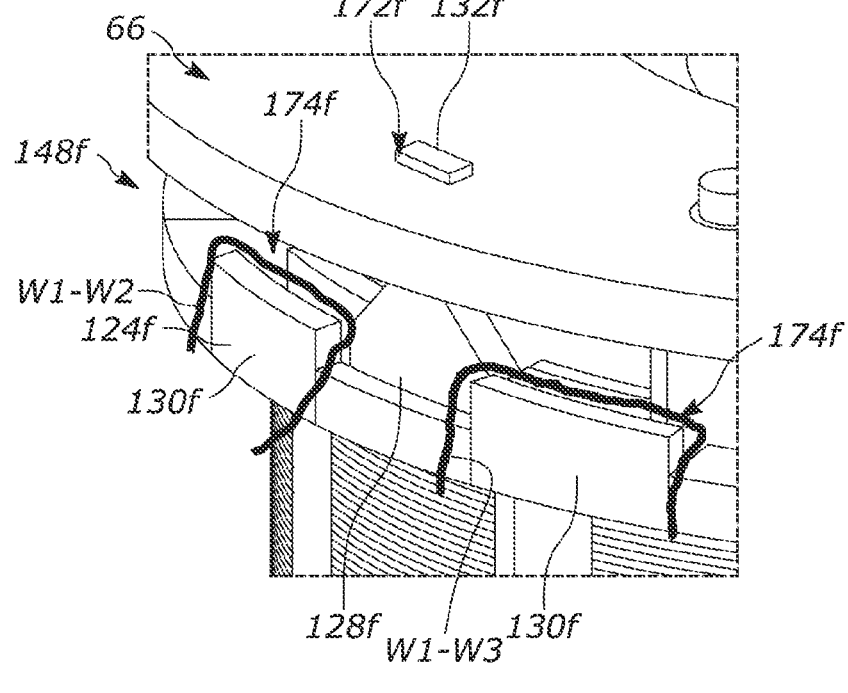
FIG. 52 is a partial perspective view of portions of the terminal arrangement of FIG. 50.

FIGS. 50-52 illustrate another embodiment of a terminal arrangement 122*f* for connecting the coils 32 to one or more sources of electrical power. The terminal arrangement 122*f* includes a commutator ring 148*f* that includes a plurality of terminals 124*f* arranged within a ring structure and spaced apart from one another by equal intervals. Specifically, the commutator ring 148*f* includes three terminals 124*f* that are connected to one another by three insulating segments 150*f*, such that together the terminals 124*f* and the insulating segments 150*f* form a ring-shaped structure. In other embodiments (not shown) the terminals 124*f* can be supported by a continuous molded ring. In the illustrated embodiment, the commutator ring 148*f* is affixed to the PCBA 66 described herein with respect to FIG. 22A. Each terminal 124*f* includes a base portion 128*f*, two tangs 130*f* extending generally laterally from two opposite sides of the base portion 128*f*, and a connection portion 132*f* extending away axially from the base portion 128*f*. The connection portion 132*f* of each terminal 124*f* is received into a corresponding through hole 172*f* formed in the PCBA 66 to mechanically and electrically connect the terminal 124*f* to the PCBA 66. As such, the commutator ring 148*f* is affixed directly to the PCBA 66 itself and is not directly supported by the insulator 36. Each tang 130*f* defines a slot 174*f* that receives two respective leads of the windings W1-W3 to electrically connect the windings W1-W3 to the terminals 124*f*. This simplifies the winding process as compared to the terminal arrangement 122 described herein by requiring fewer lead connections per tang 130*f*. In addition, an inner diameter of the commutator ring 148*f* is larger than an outer diameter of the stator core assembly 28, so that the commutator ring 148*f* is positioned about the first axial end 108 of the stator core assembly 28. That is, the commutator ring 148*f* surrounds the first axial end 108 of the stator core assembly 28 or surrounds an outer circumference of the stator core assembly 28. This provides space savings because the commutator ring 148*f* does not need to fit between the stator core assembly 28 and the PCBA 66. In addition, an outer diameter of the commutator ring 148*f* is less than or equal to the outer diameter of the PCBA 66 so that the commutator ring 148*f* does not increase an overall outer diameter of the assembled motor 14.

Figure 53:
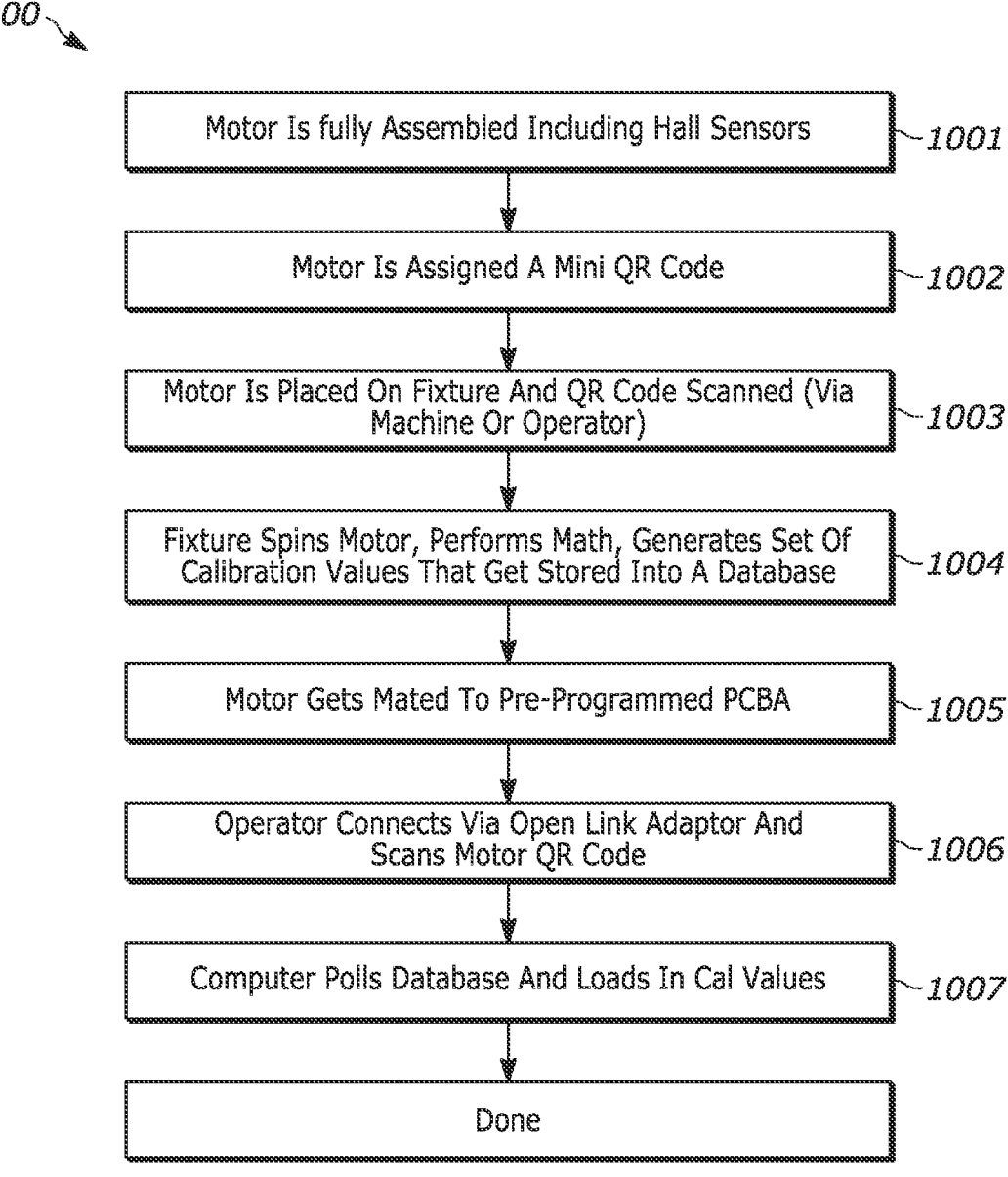
FIG. 53 is a flow chart illustrating a calibration method for the electric motor of FIG. 2.

FIG. 53 illustrates a method 1000 of calibrating the motor 14 on a per motor basis. There is a risk that tolerance stack ups on the motor 14 can cause excessive angle deviations between the position sensors 118 of the PCBA 66 and the permanent magnets 56 of the rotor 22. This can cause improper commutation that affects power and efficiency. The calibration method 1000 can measure these angle deviations due to manufacturing tolerances and compensate for them on a per motor basis.

In step 1001 of the method 1000, the motor 14 is fully assembled. In step 1002, the motor 14 is assigned a specific QR code. In step 1003, the motor 14 is placed on a fixture (not shown) that includes a separate motor, a scope, a power source, a Delta to Wye resistor bridge, connectors for each winding phase and position sensor signal of the motor 14, a QR code scanner, and a computer. During step 1003, the QR code of the specific motor 14 is scanned. Next, the fixture spins the motor 14 and generates and stores a set of calibration values (step 1004). A pre-programmed PCBA (not shown) is then installed to the motor 14 (step 1005). In step 1006, an operator connects to the pre-programmed PCBA (e.g., via the computer and an adapter) and scans the QR code. Lastly, in step 1007, based on the QR code, the computer loads the corresponding calibration values from step 1004 into the PCBA.

Figure 9:
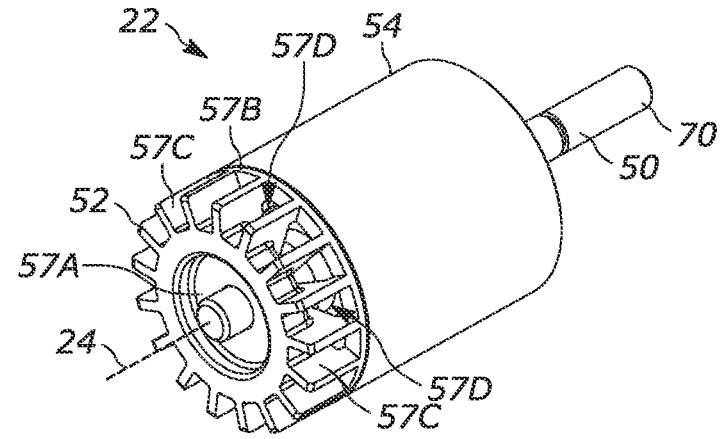
FIGS. 9 and 10 are perspective views of a rotor of the electric motor of FIG. 2.
Figure 10:
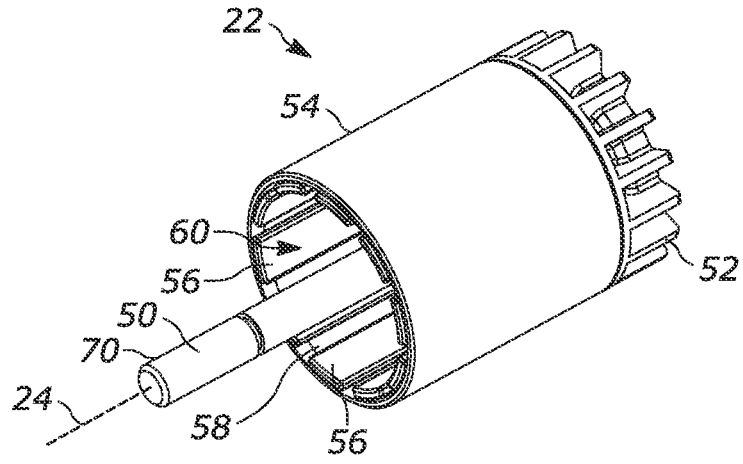
Figure 11:
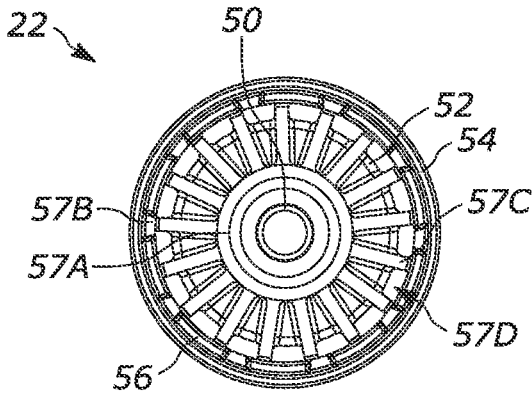
FIG. 11 is a front view of the rotor of FIG. 9.
Figure 54:
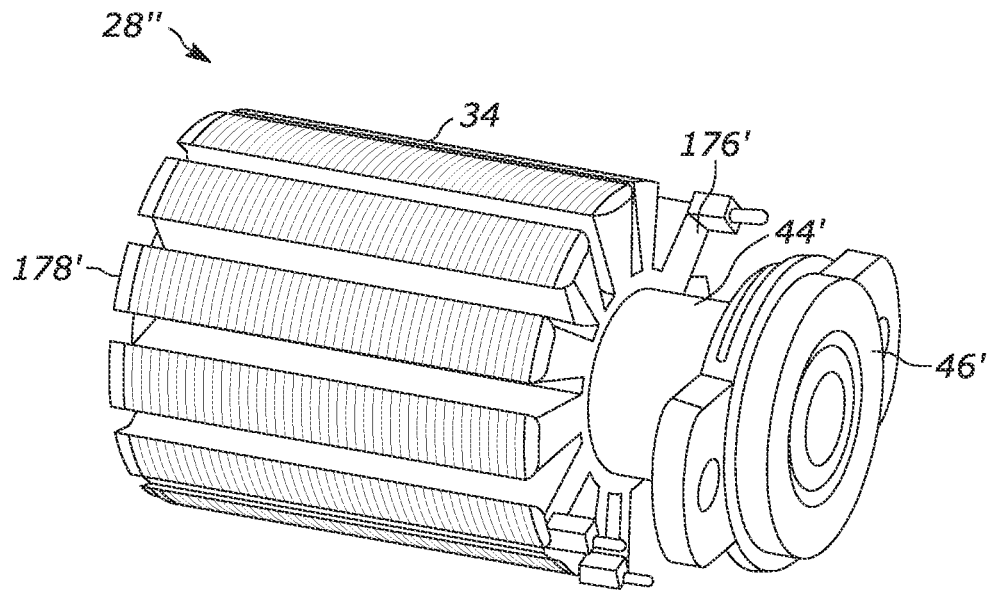
FIG. 54 is a perspective view of a stator core assembly of the stator of FIG. 7 according to another embodiment.

FIG. 54 illustrates an alternative embodiment of a stator core assembly 28' that can be utilized in the motor 14 (FIG. 2) in place of both the stator core assembly 28 and the stator mount 26 (FIGS. 8 and 9). The stator core assembly 28' includes the same stator core 34 as the stator core assembly 28 but includes a molded insulator mount 176' that differs from the insulator 36 and replaces the stator mount 26 described above. The molded insulator mount 176' includes an insulator portion 178', a stator support portion 44', and a motor support portion 46' that are all integrally formed together via, e.g., a molding process. In other words, the molded insulator mount 176' is a unitary molded part that includes the structures of both the insulator 36 and the stator mount 26 heretofore described. As such, the insulator portion 178' is substantially similar to the insulator 36 of FIGS. 8 and 9, the stator support portion 44' is substantially similar to the stator support portion 44, and the motor support portion 46' is substantially similar to the motor support portion 46. The molded insulator mount 176' can be formed by a molding process (e.g., injection molding), and can be molded before or after winding. Moreover, the molded insulator mount 176' can be formed by a two-part molding process. The insulator portion 178' and the stator support portion 44' can be formed by a first molding step, and then the motor support portion 46' can be molded to the stator support portion 44' during a subsequent second molding step. This allows the stator core assembly 28' to be wound after the first molding step and prior to the second molding step.

Figure 55:
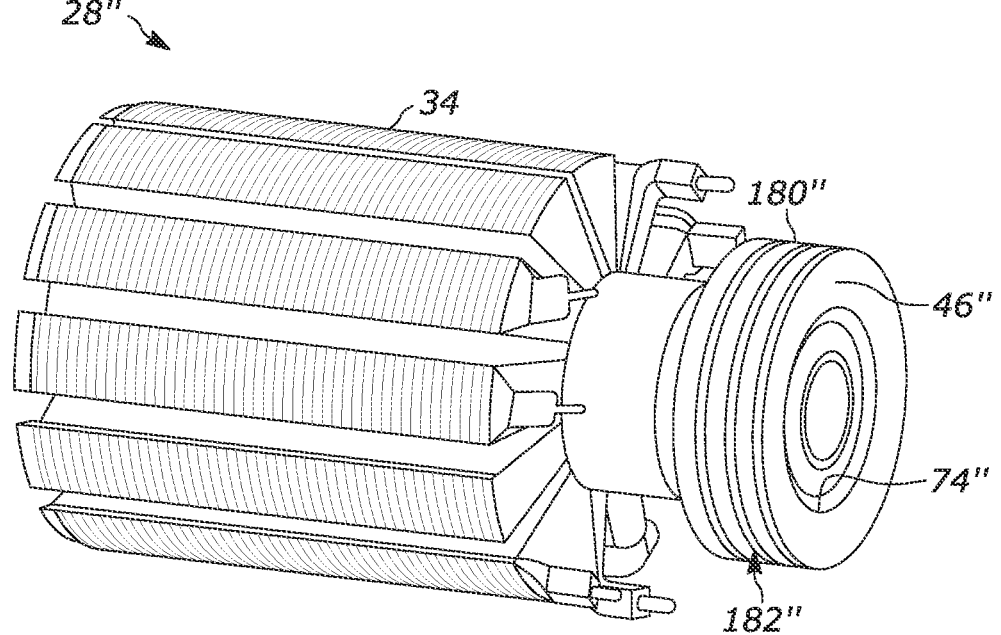
FIG. 55 is a perspective view of a stator core assembly of the stator of FIG. 7 according to another embodiment.

FIG. 55 illustrates another embodiment of a stator core assembly 28" that can be utilized in the motor 14 (FIG. 2) in place of both the stator core assembly 28 and the stator mount 26 (FIGS. 8 and 9). The stator core assembly 28" is similar to the stator core assembly 28' (FIG. 54), except that the stator core assembly 28" includes a motor support portion 46" that differs from the motor support portion 46'. The motor support portion 46" does not include tabs with screw bosses. Instead, the motor support portion 46" includes a generally cylindrical body 180" that defines a first bearing pocket 74" and includes a threaded outer surface 182". The threaded outer surface 182" can thread to an internally threaded support structure (not shown), such as a gear case, to support the motor 14.

Figure 56:
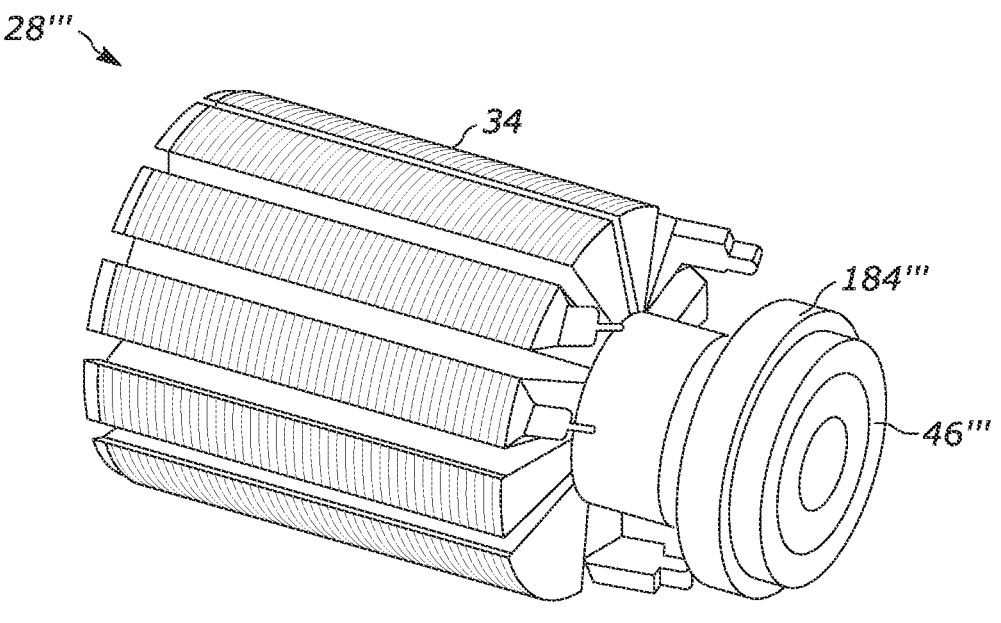
FIGS. 56 and 57 are perspective views of a stator core assembly of the stator of FIG. 7 according to another embodiment.
Figure 57:
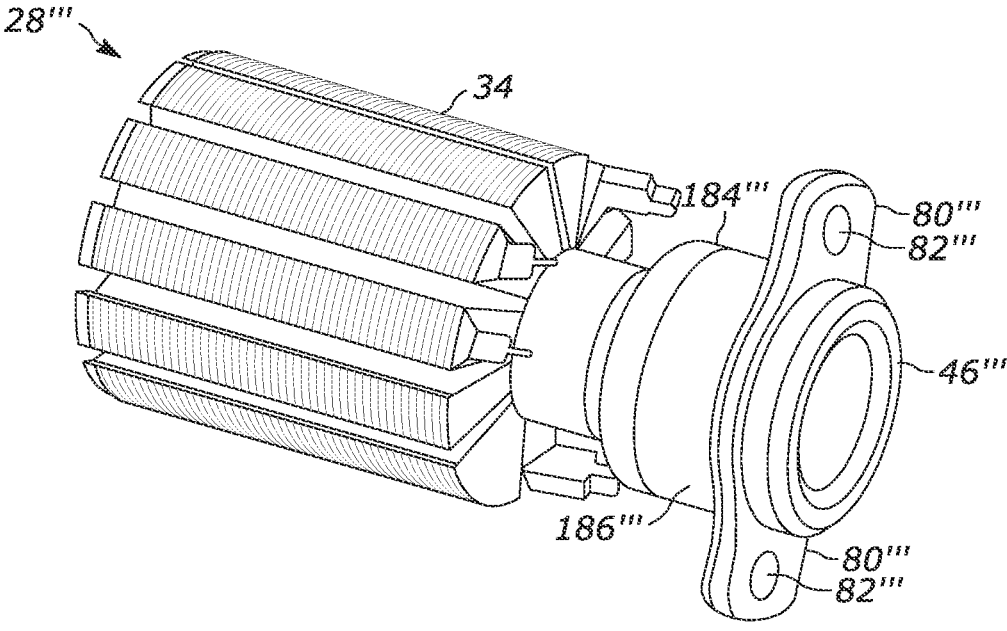

FIGS. 56 and 57 illustrate another embodiment of a stator core assembly 28''' that can be utilized in the motor 14 (FIG. 2) in place of both the stator core assembly 28 and the stator mount 26 (FIGS. 8 and 9). The stator core assembly 28''' is similar to the stator core assembly 28' (FIG. 54), except that the stator core assembly 28''' includes a motor support portion 46''' that differs from the motor support portion 46'. In particular, the motor support portion 46''' includes a first portion 184''' that is integrally formed with a stator support portion 44''' and an insulator portion 178''', and a second portion 186''' that is formed separately from the first portion 184'''. The first portion 184''' defines a first bearing pocket 74'''. The second portion 186''' includes tabs 80''' and screw bosses 82''' for securing the motor support portion 46''' to an external mounting structure. The first portion 184''' can be formed during a first molding step, and then the second portion 186''' can be formed and coupled to the first portion 184''' during a subsequent second molding step.

Although the disclosure has been described in detail with reference to certain preferred embodiments, variations and modifications exist within the scope and spirit of one or more independent aspects of the disclosure as described.

What is claimed is:

1. An electric motor comprising:

a rotor assembly including a rotor shaft, a rotor body fixedly coupled to the rotor shaft, and a plurality of magnets coupled to the rotor body;

a stator assembly at least partially received within the rotor body, the stator assembly including a stator mount including a stator support portion and a motor support portion, and a stator core assembly fixedly supported by the stator mount, the stator core assembly defining a central bore that receives the rotor shaft and the stator support portion; and a bearing having an outer race and an inner race, the outer race being supported by the stator core assembly, and the inner race supporting the rotor shaft for rotation relative to the stator assembly;

wherein the stator core assembly further defines a bearing pocket adjacent the central bore and configured to receive the outer race of the bearing;

wherein a step is formed where the bearing pocket transitions to the central bore;

wherein the stator core assembly includes a stator core and an insulator coupled to the stator core;

wherein the electric motor further comprises a printed circuit board assembly (PCBA) affixed to the insulator; and wherein the motor support portion defines an aperture configured to receive a pin, the pin securing the motor support portion to a gear case.

2. The electric motor of claim 1, wherein the central bore has a first diameter, and wherein the bearing pocket has a second diameter that is greater than the first diameter.

3. The electric motor of claim 1, wherein the step fixes a position of the bearing in an axial direction.

4. The electric motor of claim 1, wherein the bearing pocket is a second bearing pocket and the bearing is a second bearing, and wherein the motor support portion defines a first bearing pocket configured to receive a first bearing such that an inner race of the first bearing supports the rotor shaft for rotation relative to the stator assembly.

5. The electric motor of claim 1, wherein the PCBA is positioned between the rotor body and the motor support portion in an axial direction.

6. The electric motor of claim 1, wherein the insulator defines a plurality of standoffs that protrude axially away from the stator core, and wherein the PCBA includes a circuit board that defines a plurality of through holes configured to receive the plurality of standoffs to secure the PCBA to the insulator.

7. The electric motor of claim 6, wherein a distal end of each standoff of the plurality of standoffs defines a flange having a diameter larger than a diameter of each through hole of the plurality of through holes.

8. The electric motor of claim 7, wherein the insulator further defines a plurality of posts that protrude axially away from the stator core, and wherein each standoff of the plurality of standoffs protrudes from each respective post of the plurality of posts.

9. The electric motor of claim 8, wherein a shoulder is defined between each standoff of the plurality of standoffs and each respective post of the plurality of posts, and wherein the shoulder abuts a surface of the circuit board.

10. The electric motor of claim 9, wherein the circuit board is captured between each shoulder and each flange.

11. A power tool comprising:

a housing;

an electric motor including a rotor assembly including a rotor shaft, a rotor body fixedly coupled to the rotor shaft, and a plurality of magnets coupled to the rotor body, and a stator assembly at least partially received within the rotor assembly, the stator assembly including a stator mount having a stator support portion and a motor support portion, and a stator core assembly fixedly supported by the stator mount, the stator core assembly defining a central bore that receives the rotor shaft and the stator support portion;

an adapter configured to fixedly couple to the motor support portion, the adapter including a first coupler; and a gear case including a second coupler configured to be received by the first coupler to removably couple the adapter to the gear case.

12. The power tool of claim 11, wherein the adapter further includes a base plate and the first coupler comprises a bayonet coupler protruding from the base plate and defining a slot, and wherein the second coupler comprises a tab configured to be received into the slot.

13. The power tool of claim 12, wherein the motor support portion includes a tab, and wherein one of the tab and the base plate includes a screw boss, and wherein the power tool further includes a screw that inserts into the other of the tab and the base plate and tightens into the screw boss.

14. An electric motor comprising:

a rotor assembly including a rotor shaft, a rotor body fixedly coupled to the rotor shaft, and a plurality of magnets coupled to the rotor body;

a stator assembly at least partially received within the rotor body, the stator assembly including a stator mount including a stator support portion and a motor support portion, a stator core assembly fixedly supported by the stator mount, the stator core assembly including a stator core and an insulator coupled to the stator core, the stator core defining a central bore that receives the rotor shaft and the stator support portion, and a plurality of windings that define a plurality of coils supported on the stator core assembly; and a printed circuit board assembly (PCBA) affixed to the insulator;

wherein the insulator defines a plurality of standoffs that protrude axially away from the stator core;

wherein the PCBA includes a circuit board that defines a plurality of through holes configured to receive the plurality of standoffs to secure the PCBA to the insulator; and wherein a distal end of each standoff of the plurality of standoffs defines a flange having a diameter larger than a diameter of each through hole of the plurality of through holes.

15. The electric motor of claim 14, wherein the insulator further defines a plurality of posts that protrude axially away from the stator core, and wherein each standoff of the plurality of standoffs protrudes from each respective post of the plurality of posts.

16. The electric motor of claim 15, wherein a shoulder is defined between each standoff of the plurality of standoffs and each respective post of the plurality of posts, and wherein the shoulder abuts a surface of the circuit board.

17. The electric motor of claim 16, wherein the circuit board is captured between each shoulder and each flange.

18. The electric motor of claim 14, wherein the plurality of through holes are further configured to receive the plurality of standoffs in only one orientation of the PCBA relative to the insulator.

19. The electric motor of claim 14, wherein the PCBA further includes a plurality of position sensors.

20. The electric motor of claim 19, wherein the circuit board has an arc-shape.

21. The electric motor of claim 19, wherein the rotor assembly is configured to rotate about an axis, and wherein the circuit board extends less than 180 degrees about the axis.

* * * * *